United States Patent
Moganti et al.

(10) Patent No.: US 8,849,827 B2
(45) Date of Patent: Sep. 30, 2014

(54) METHOD AND APPARATUS FOR AUTOMATICALLY TAGGING CONTENT

(71) Applicant: Alcatel Lucent, Paris (FR)

(72) Inventors: Madhav Moganti, Edison, NJ (US); Anish Sankalia, Lawrenceville, GA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/038,951

(22) Filed: Sep. 27, 2013

(65) Prior Publication Data

US 2014/0025680 A1    Jan. 23, 2014

Related U.S. Application Data

(63) Continuation of application No. 12/883,315, filed on Sep. 16, 2010, now Pat. No. 8,655,881, and a continuation of application No. 12/883,355, filed on Sep. 16, 2010, now Pat. No. 8,666,978.

(51) Int. Cl.
*G06F 17/30* (2006.01)

(52) U.S. Cl.
CPC .... *G06F 17/30038* (2013.01); *G06F 17/30014* (2013.01)
USPC ........... 707/737; 707/803; 707/758; 235/451; 235/435; 725/60

(58) Field of Classification Search
CPC .............. H04N 21/00; G06F 17/30997; G06F 17/30017; G06F 17/300244; G06F 17/30781; G06F 17/3074; G06F 17/30256; G06F 13/3079
USPC .......... 707/803, 758, 737, E17.005, E17.045; 235/451, 435, 454, 462.01, 439; 725/60
See application file for complete search history.

(56) References Cited

U.S. PATENT DOCUMENTS 5,850,352 A    12/1998  Moezzi et al.
5,938,704 A    8/1999   Torii
(Continued)

FOREIGN PATENT DOCUMENTS

| WO | WO 03/041000 | 5/2003 |
| WO | WO 2009/112585 | 9/2009 |
| WO | WO 2010/046123 | 4/2010 |

OTHER PUBLICATIONS

Schaffert et al.—"KiWi—A Platform for Semantic Social Software"—The Semantic Web: Research and Applications, LNCS vol. 5554, 2009 (pp. 888-892).*

(Continued)

*Primary Examiner* — Anh Ly
(74) *Attorney, Agent, or Firm* — Wall & Tong LLP

(57) ABSTRACT

A content tagging and management capability is provided for enabling automatic tagging of content and management of tagged content. A method includes receiving content including an object, and automatically associating an information structure with the object included within the content to form thereby tagged content. The content may be received locally at a content capture device, and the information structure may be automatically associated with the object by the content capture device. The automatic tagging may be performed at the content capture device when the content is captured by the content capture device. The content may be received at a computer, and the information structure may be automatically associated with the object by the computer. The information structure may be available locally or retrieved from one or more remote devices.

17 Claims, 14 Drawing Sheets

(56) References Cited

U.S. PATENT DOCUMENTS

| | | | |
|---|---|---|---|
| 6,020,891 A | 2/2000 | Rekimoto | |
| 6,037,936 A | 3/2000 | Ellenby et al. | |
| 6,414,696 B1 | 7/2002 | Ellenby et al. | |
| 6,526,215 B2* | 2/2003 | Hirai et al. | 715/723 |
| 6,629,104 B1 | 9/2003 | Parulski et al. | |
| 6,636,249 B1 | 10/2003 | Rekimoto | |
| 6,678,425 B1 | 1/2004 | Flores et al. | |
| 6,880,755 B2 | 4/2005 | Gorbet et al. | |
| 7,063,260 B2 | 6/2006 | Mossberg et al. | |
| 7,095,422 B2 | 8/2006 | Shouji | |
| 7,154,395 B2 | 12/2006 | Raskar | |
| 7,171,627 B2 | 1/2007 | Sawatari | |
| 7,290,061 B2 | 10/2007 | Lentini et al. | |
| 7,295,101 B2 | 11/2007 | Ward et al. | |
| 7,341,189 B2 | 3/2008 | Mossberg et al. | |
| 7,724,250 B2 | 5/2010 | Ishii et al. | |
| 8,200,669 B1 | 6/2012 | Impietro et al. | |
| 2002/0013792 A1 | 1/2002 | Imielinski et al. | |
| 2002/0087496 A1 | 7/2002 | Stirpe et al. | |
| 2002/0091835 A1* | 7/2002 | Lentini et al. | 709/227 |
| 2002/0131760 A1* | 9/2002 | Hirai et al. | 345/724 |
| 2002/0174185 A1 | 11/2002 | Rawat et al. | |
| 2002/0194130 A1 | 12/2002 | Maegawa et al. | |
| 2004/0173680 A1 | 9/2004 | Mossberg et al. | |
| 2004/0199604 A1 | 10/2004 | Dobbins et al. | |
| 2005/0001920 A1 | 1/2005 | Endler et al. | |
| 2005/0010750 A1 | 1/2005 | Ward et al. | |
| 2005/0011959 A1 | 1/2005 | Grosvenor | |
| 2005/0208930 A1 | 9/2005 | Zmrzli | |
| 2006/0001543 A1 | 1/2006 | Raskar et al. | |
| 2006/0081714 A1 | 4/2006 | King et al. | |
| 2006/0093237 A1 | 5/2006 | Jacobsen et al. | |
| 2006/0136964 A1* | 6/2006 | Diez et al. | 725/37 |
| 2006/0218479 A1* | 9/2006 | Torres | 715/500 |
| 2006/0219791 A1 | 10/2006 | Mossberg et al. | |
| 2006/0227151 A1 | 10/2006 | Bannai | |
| 2006/0286536 A1 | 12/2006 | Mohler et al. | |
| 2007/0001841 A1 | 1/2007 | Anders et al. | |
| 2007/0043852 A1 | 2/2007 | Robbins et al. | |
| 2007/0080216 A1 | 4/2007 | Ward et al. | |
| 2007/0108285 A1* | 5/2007 | Lapstun et al. | 235/454 |
| 2007/0123280 A1 | 5/2007 | McGary et al. | |
| 2007/0192352 A1 | 8/2007 | Levy | |
| 2007/0208711 A1 | 9/2007 | Rhoads et al. | |
| 2007/0233622 A1 | 10/2007 | Willcock | |
| 2007/0260627 A1* | 11/2007 | Knittel et al. | 707/101 |
| 2007/0271498 A1 | 11/2007 | Schachter | |
| 2008/0018668 A1 | 1/2008 | Yamauchi | |
| 2008/0027983 A1 | 1/2008 | Erol et al. | |
| 2008/0067244 A1* | 3/2008 | Marks | 235/385 |
| 2008/0071770 A1 | 3/2008 | Schloter et al. | |
| 2008/0104019 A1 | 5/2008 | Nath | |
| 2008/0134043 A1 | 6/2008 | Georgis et al. | |
| 2008/0161044 A1 | 7/2008 | Baker et al. | |
| 2008/0189099 A1* | 8/2008 | Friedman et al. | 704/8 |
| 2008/0200154 A1 | 8/2008 | Maharajh et al. | |
| 2008/0201734 A1* | 8/2008 | Lyon et al. | 725/34 |
| 2008/0209329 A1 | 8/2008 | DeFranco et al. | |
| 2008/0218515 A1 | 9/2008 | Rukushima et al. | |
| 2008/0228749 A1 | 9/2008 | Brown | |
| 2008/0256368 A1* | 10/2008 | Ross et al. | 713/193 |
| 2008/0262839 A1 | 10/2008 | Nonaka | |
| 2008/0268876 A1* | 10/2008 | Gelfand et al. | 455/457 |
| 2008/0288476 A1* | 11/2008 | Kim et al. | 707/E17.014 |
| 2009/0136210 A1 | 5/2009 | Morimoto | |
| 2009/0144668 A1 | 6/2009 | Yeh | |
| 2009/0150553 A1 | 6/2009 | Collart et al. | |
| 2009/0161963 A1* | 6/2009 | Uusitalo et al. | 382/203 |
| 2009/0171783 A1* | 7/2009 | Raju | 705/14 |
| 2009/0210395 A1 | 8/2009 | Sedam | |
| 2009/0216769 A1 | 8/2009 | Bellwood et al. | |
| 2009/0228492 A1 | 9/2009 | Valdez et al. | |
| 2009/0259745 A1 | 10/2009 | Lee | |
| 2009/0262206 A1 | 10/2009 | Park | |
| 2009/0300026 A1 | 12/2009 | Masuda | |
| 2009/0300109 A1 | 12/2009 | Porter | |
| 2009/0313304 A1 | 12/2009 | Goodger et al. | |
| 2010/0002606 A1 | 1/2010 | Preis et al. | |
| 2010/0020970 A1 | 1/2010 | Liu et al. | |
| 2010/0029326 A1 | 2/2010 | Bergstrom et al. | |
| 2010/0042747 A1 | 2/2010 | Hascalovici et al. | |
| 2010/0048242 A1 | 2/2010 | Rhoads et al. | |
| 2010/0063970 A1 | 3/2010 | Kim | |
| 2010/0076976 A1 | 3/2010 | Sotirov et al. | |
| 2010/0082709 A1 | 4/2010 | Yamamoto | |
| 2010/0083303 A1 | 4/2010 | Redei et al. | |
| 2010/0094895 A1 | 4/2010 | Arrasvuori | |
| 2010/0097473 A1* | 4/2010 | Park et al. | 348/159 |
| 2010/0161631 A1 | 6/2010 | Yu et al. | |
| 2010/0180216 A1 | 7/2010 | Bates et al. | |
| 2010/0191755 A1* | 7/2010 | Kim et al. | 707/758 |
| 2010/0198841 A1 | 8/2010 | Parker et al. | |
| 2010/0198876 A1 | 8/2010 | Estok | |
| 2010/0211535 A1 | 8/2010 | Rosenberger | |
| 2010/0281399 A1* | 11/2010 | Banker | 715/758 |
| 2010/0312596 A1 | 12/2010 | Saffari | |
| 2011/0029398 A1 | 2/2011 | Boudville | |
| 2011/0035284 A1 | 2/2011 | Moshfeghi | |
| 2011/0052083 A1 | 3/2011 | Rekimoto | |
| 2011/0225417 A1* | 9/2011 | Maharajh et al. | 713/150 |
| 2011/0238650 A1 | 9/2011 | Jenkins et al. | |
| 2011/0246495 A1 | 10/2011 | Mallinson | |
| 2011/0254861 A1 | 10/2011 | Emura et al. | |
| 2011/0279479 A1 | 11/2011 | Rodriguez | |
| 2012/0023522 A1 | 1/2012 | Anderson et al. | |
| 2012/0045093 A1 | 2/2012 | Salminen et al. | |
| 2012/0067954 A1 | 3/2012 | Moganti et al. | |
| 2012/0072419 A1 | 3/2012 | Moganti et al. | |
| 2012/0072420 A1 | 3/2012 | Moganti et al. | |
| 2012/0072463 A1 | 3/2012 | Moganti et al. | |
| 2014/0089517 A1* | 3/2014 | Wei et al. | 709/231 |

OTHER PUBLICATIONS

Jacobson et al.—"Networking Named Content"—Proceeding CoNEXT'09 Proceedings of the 5th International Conference on Emerging Networking Experiments and Technologies, Dec. 1-4, 2009 Rome, Italy—(pp. 1-12).*

"Open Scaleable Architecture for Multimedia Telemedicine Applications"—Recommendations for medical structured data transmission in CEC/NIS countries—1999 —pp. 1-97.

Giasemi Vavoula—"Report on literature on mobile learning, science and collaborative activity"—Nov. 2005—pp. 1-101 Prepared for the European Commission, DG INFSO, under contract N. IST 507838 as a deliverable WP33 Submitted on Dec. 22, 2005 from Kaleidoscope.

The International Search Report and The Written Opinion of the International Search Authority, or the Declaration in PCT/US2011/050848, mailed Nov. 10, 2011, Alcatel-Lucent USA Inc., Applicant, 11 pages.

Tsouknidas Nikolaos et al. "QR-code calibration for mobile augmented reality applications", ACM SIGGRAPH 2010 Posters on, SIGGRAPH '10, Jan. 1, 2010, p. 1, XP55011209, New York, New York, USA, DOI: 10.1146/1836845.1836999 ISBN 978-1-45-030393-4.

Feb. 16, 2012 Notification of Transmittal of the International Search Report and the Written Opinion of the International Searching Authority, or the Declaration in PCT/US2011/051491, Alcatel-Lucent USA Inc., Applicant, 7 pages.

Feb. 23, 2012 Notification of Transmittal of the International Search Report and the Written Opinion of the International Searching Authority, or the Declaration in PCT/US2011/061164, Alcatel-Lucent USA Inc., Applicant, 6 pages.

Jean Carletta and Jonathan Kilgour—"The NITE XML Toolkit Meets the ICSI Meeting Corpus; Import, Annotation and Browsing"—S. Bengio and H. Bourlard (Eds.): MLMI 2004, LNCS vol. 3361, pp. 111-121. 2005, Springer-Verlag Berlin Heidelberg 2005.

James Hendler and Jennifer Golbeck—"Metcalfe's law, Web, 2.0, and the Semantic Web"—Web Semantics: Science, Services and Agents on the World Wide Web vol. 6. issue 1, Feb. 2008; (pp. 14-20).

Lawrence Stark, "Space Constancy and Corolary Discharge," Perception & Psychophysics, 1985, 37(3), pp. 272-273.

* cited by examiner

METHOD AND APPARATUS FOR AUTOMATICALLY TAGGING CONTENT

CROSS-REFERENCE TO RELATED APPLICATIONS

This application is a continuation of pending U.S. patent application Ser. No. 12/883,315, filed on Sep. 16, 2010, entitled METHOD AND APPARATUS FOR AUTOMATICALLY TAGGING CONTENT, and is a continuation of pending U.S. patent application Ser. No. 12/883,355, filed on Sep. 16, 2010, entitled "METHOD AND APPARATUS FOR MANAGING CONTENT TAGGING AND TAGGED CONTENT," each of which is incorporated by reference herein in its entirety.

FIELD OF THE INVENTION

The invention relates generally to content generation and management and, more specifically but not exclusively, to automatic content tagging and management of tagged content.

BACKGROUND

Today, end users are generating enormous amounts of content, including content in the form of pictures and videos, and are relaying the content to their various media networks (e.g., content storage networks, cloud computing infrastructure, social networks, and the like) via various user devices (e.g., desktops, palmtops, e-readers, handhelds, and like devices). In most cases, these pictures and videos do not convey any information apart from the visual, and sometimes aural, details of the pictures and videos. It is often said that a picture is worth a thousand words; however, in most cases those thousand words are not known without an explanation by the end user who took the associated picture or video. While attempts have been made to augment such content with additional information, augmenting of content is currently a highly manual process with little or no improvement over the way that content is produced in the print media.

SUMMARY

Various deficiencies in the prior art are addressed by embodiments for automatically tagging content and/or managing tagged content.

In one embodiment, a method includes receiving content including an object, and automatically associating an information structure with the object included within the content to form thereby tagged content.

In one embodiment, a computer readable storage medium stores instructions which, when executed by a processor, cause the processor to perform a method including steps of receiving content including an object, and automatically associating an information structure with the object included within the content to form thereby tagged content.

In one embodiment, an apparatus includes a processor configured for receiving content including an object, and automatically associating an information structure with the object included within the content to form thereby tagged content.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
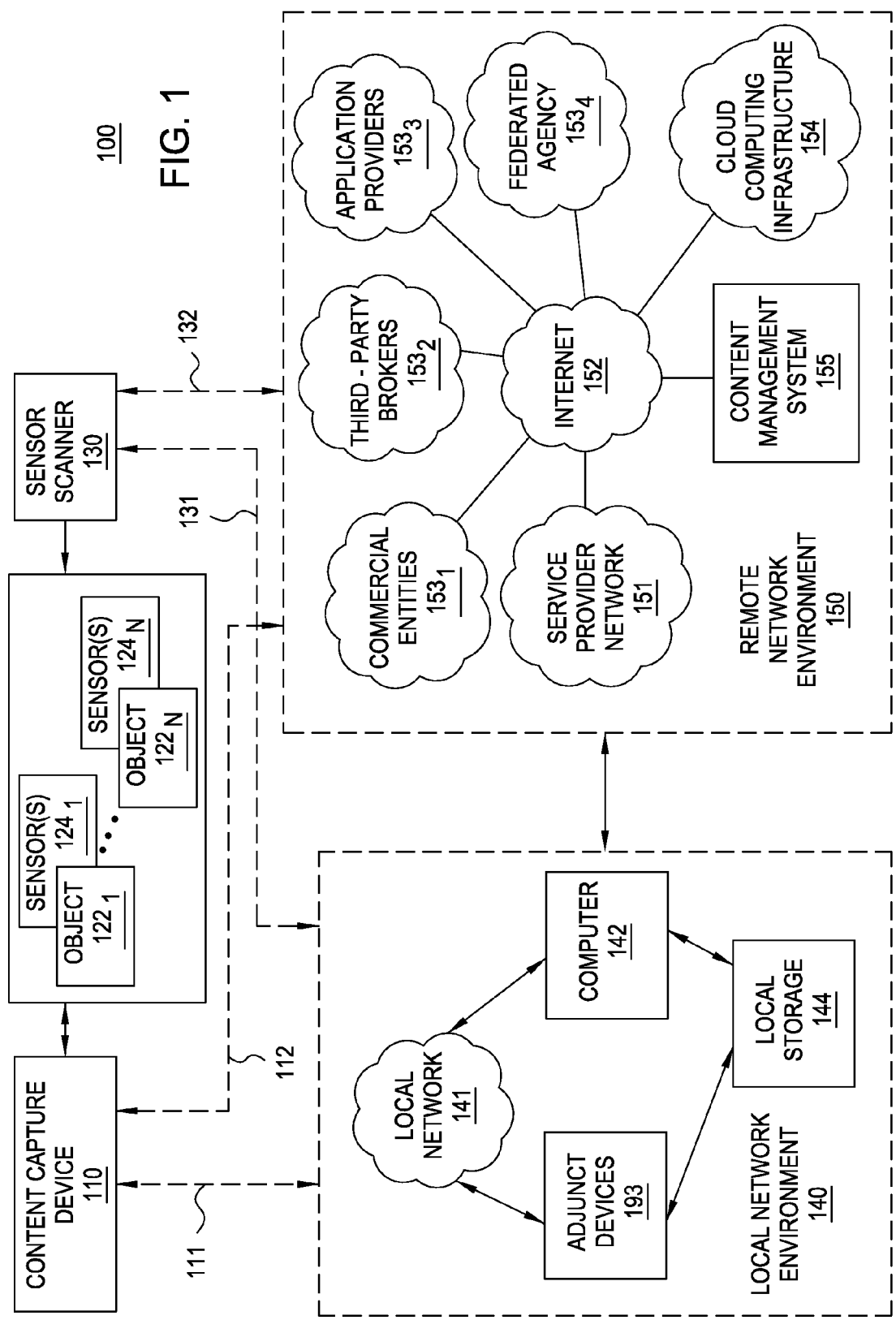
FIG. 1 depicts a high-level block diagram of an exemplary content tagging system.

A content tagging and management capability is depicted and described herein. The content tagging and management capability may include various constituent capabilities which may operate individually and/or in combination to provide various content tagging and/or tagged content management functions as depicted and described herein.

An automatic content tagging capability is depicted and described herein. The automatic content tagging capability is adapted for automatically tagging content with a content tag having an information structure associated therewith. The content tag is associated with an object included within the tagged content, where the object may include a physical object represented within the tagged content, content associated with the tagged content, and the like. The information structure includes object information associated with the object with which the content tag is associated (e.g., a description of the object, one or more pointers to additional information associated with the object, and the like, as well as various combinations thereof). The selection of the content tag provides access to the object information of the information structure.

A tagged content distribution capability is depicted and described herein. The tagged content distribution capability provides distribution of tagged content to various public and/or private platforms, such as private user platforms, social media portals, media servers (e.g., at home, at work, and the like), and the like, as well as various combinations thereof. In this manner, the tagged content distribution capability enables a secured and permission-based distribution of tagged content to any computing platform with storage to ensure that the tagged content is readily available.

A tagged content management capability is depicted and described herein. The tagged content management capability may include management of content tagging and/or management of tagged content, as well as various other related management functions. For example, management functions may include one or more of providing registration management functions (e.g., managing registration of users, sensors, scanners, entities, providers, advertisers, and the like), automatic content tagging and tagged content management functions (e.g., management of sensor permissions, permissions validation during automatic content tagging related activities, tagged content ownership management functions, management of tagged content permissions, and the like), tagged content delivery management functions (e.g., managing permissions associated with tagged content, managing other criteria associated with access to tagged content, and the like), tagged content advertising management functions (e.g., advertiser management functions, tagged content performance tracking functions, user remuneration management functions, and the like), and the like, as well as various combinations thereof. Various other embodiments related to automatic tagging of content and management of tagged content are depicted and described herein.

Although primarily depicted and described herein with respect to automatic tagging of image-based content (e.g., images, videos, and the like), the content tagging and management capability may be used for automatically tagging other forms of content and information and/or for managing other forms of tagged content and information (e.g., text-based content, audio-based content, multimedia content, widgets, software defined objects, and the like, as well as various combinations thereof).

FIG. 1 depicts a high-level block diagram of an exemplary content tagging system.

As depicted in FIG. 1, content tagging system 100 includes a content capture device 110, a sensor environment 120, a sensor scanner 130, a local network environment 140, and a remote network environment 150. It will be appreciated that use of the terms local and remote may indicate the relation of these networks to the content capture device 110 (e.g., with local network environment 140 being close to content capture device 110 and remote network environment being further from content capture device 110).

The content capture device 110 is configured for capturing content, such as one or more of text-based content, image-based content (e.g., pictures, videos, and the like), multimedia content, and the like, as well as various combinations thereof. For example, content capture device 110 may be a picture camera (e.g., supporting capture of only still pictures, supporting capture of both still pictures and audio/video, and the like), a video camera (e.g., supporting capture of only audio/video, supporting capture of both audio/video and still pictures, and the like), a smartphone having a camera and/or audio/video capture capabilities, or any other similar device that is capable of capturing content. In existing content capture devices, such content capture mechanisms are used independent of each other; however, in at least some embodiments of the automatic content tagging capability, multiple such content capture mechanisms may be utilized in conjunction with each other in order to support automatic tagging of content-based objects (which, as described herein, may be performed in a secured and/or on-demand manner).

The content capture device 110 may be configured to (1) process the captured content in order to automatically tag the captured content and/or (2) propagate the captured content toward one or more devices configured to process the captured content in order to automatically tag the captured content.

Figure 2:
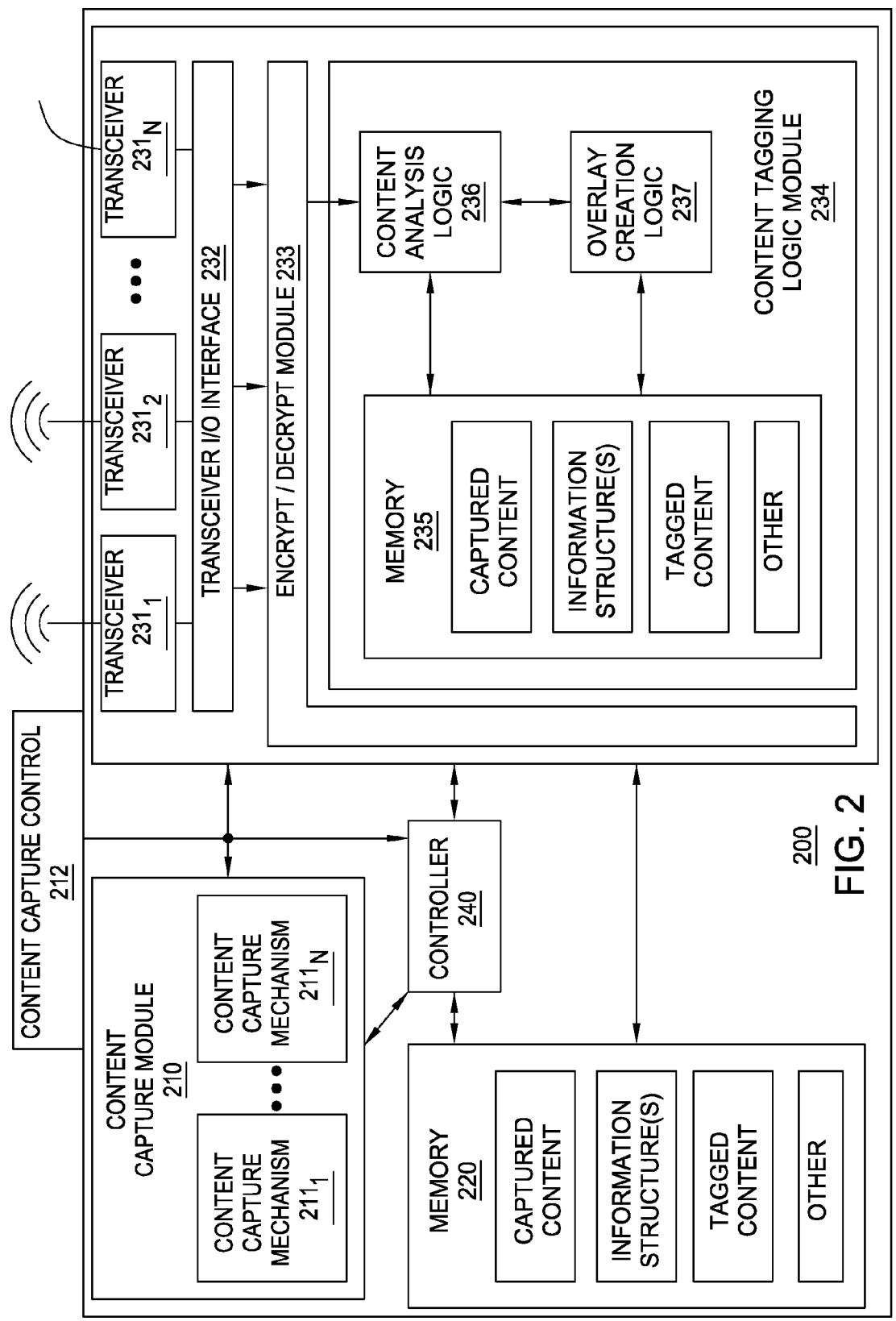
FIG. 2 depicts a high-level block diagram of one embodiment of the content capture device of FIG. 1.

An exemplary content capture device is depicted and described with respect to FIG. 2.

The sensor environment 120 includes a plurality of objects $122_1$-$122_N$ (collectively, objects 122), and each object $122_1$-$122_N$ has one or more sensors associated therewith (illustratively, represented by a plurality of sensors $124_1$-$124_N$ (collectively, sensors 124)).

As depicted in FIG. 1, each object 122 may have one or more sensors associated therewith. Although primarily depicted and described with respect to a 1:1 relationship between objects 122 and sensors 124, it will be appreciated that various other types of object-sensor relationships may be used, e.g., one object 122 may have a sensor set (i.e., multiple sensors) associated therewith, an object set (i.e., multiple objects) may have one sensor 124 associated therewith, an object set may have a sensor set associated therewith (i.e., an N:N relationship), and the like, as well as various combinations thereof.

The objects 122 represent any objects which may be captured and represented in captured content (e.g., pictures, video, and the like).

In one embodiment, for example, the objects 122 may include physical objects, portions of physical objects, and the like. In this embodiment, the sensor environment 120 may include virtually any environment having physical objects 122 on which sensors 124 may be deployed, and, in this sense, physical objects 122 may include virtually any physical objects for which content may be captured.

For example, sensors 124 may be deployed on physical objects 122 that are typically located within buildings. For example, physical objects 122 may include objects within homes (e.g., on furniture, appliances, home entertainment equipment, products, decorations, jewelry, and the like), businesses (e.g., office equipment, office decorations, and the like), museums (e.g., on artifacts, exhibits, information placards associated with artifacts and exhibits, and the like), or any other buildings having physical objects 122 which may have sensors 124 associated therewith.

For example, sensors 124 may be deployed on physical objects 122 that are typically located outside of buildings, such as consumer products typically used outside (e.g., sports equipment, lawn care equipment, and the like), transportation devices (e.g., motorcycles, cars, buses, boats, planes, and the like), and the like.

For example, sensors 124 may be deployed on structures where the structures themselves are the physical objects 122. For example, sensors 124 may be deployed on buildings accommodating families, businesses, organizations, and the like (e.g., for indicating information about the buildings, for indicating the people, businesses, and/or organizations located within the buildings, and the like, as well as various combinations thereof). For example, sensors 124 may be deployed on buildings such as museums, stadiums, and the like. For example, sensors 124 may be deployed on structures such as bridges, monuments (e.g., the Washington Monument, Jefferson Memorial, and the like), and the like. The sensors 124 may be deployed on any other types of structures such that physical objects 122 may include other types of structures.

For example, sensors 124 may be deployed on naturally occurring physical objects 122 (e.g., humans, animals, trees, points of interest on mountains, points of interest on the Grand Canyon, and the like).

Thus, from the foregoing examples of physical objects 122, it is clear that the objects 122 may encompass virtually any objects (e.g., televisions, buildings, cars, exhibits, monuments, geographical features, and the like, as well as various combinations thereof) which may be captured by content capture device 110.

In one embodiment, the objects 122 may include content objects. In this embodiment, the sensor environment 120 may include virtually any environment in which content objects 122 may be captured, and, in this sense, content objects 122 may include virtually any types of content objects which may be captured during content capture.

In one embodiment, for example, content objects may include content (e.g., pictures, audio, video, multimedia, and the like) associated with physical objects captured as part of the captured content or otherwise associated with capture of content.

For example, when a user takes a picture of a room including a television playing a movie, the television may have a sensor associated therewith such that the television becomes a physical object represented in the picture and may be automatically tagged as described herein, and, further, the movie playing on the television may be identified as a content object represented in the picture and also may be automatically tagged as described herein.

For example, when a user takes a picture in a first room having physical objects with associated sensors and music is playing from a radio in a second room, the physical objects in the first room are represented in the picture and may be automatically tagged as described herein, and, further, the music playing on the radio in the second room may be identified as a content object associated with the picture and also may be automatically tagged as described herein.

In this sense, a content object may be presented by a physical object included within the captured content (e.g., television example) or merely associated with captured content during the content capture process (e.g., radio example).

The objects 122 may include any other physical objects, content objects, and/or other objects which may be captured as part of a content capture process and represented within the captured content (e.g., as an object represented within captured content, as a content tag associated with captured content, and the like, as well as various combinations thereof).

It will be appreciated that the term objects 122 is not limited by the exemplary objects discussed herein.

As depicted in FIG. 1, each object 122 may have one or more sensors 124 associated therewith.

The sensors 124 associated with objects 122 are configured/provisioned (for simplicity, primarily referred to as configured herein) for enabling automatic tagging of content including the objects 122 with which the sensors 124 are associated.

In general, it is physical objects 122 that will have sensors 124 associated therewith, however, it is contemplated that content objects 122 also may have sensors 124 associated therewith. For example, where a content object 122 (e.g., video or audio content) is presented by a physical object 122 (e.g., television or radio) having a sensor 124 associated with it, the sensor 124 may be considered to be associated with both the physical object 122 and the content object 124. For example, where a content object 122 is merely associated with capture of content (but not necessarily associated with any particular physical object 122 captured as part of content capture), the content object 122 may or may not have a sensor 124 associated with it.

The sensors 124 associated with objects 122 may include any suitable sensors.

In one embodiment, for example, an object 122 at least has an information sensor 124 associated therewith, and also may have one or more position sensors 124 associated therewith.

In general, an information sensor 124 is adapted for enabling object information associated with the object 122 to be obtained.

In one embodiment, for example, an information sensor 124 associated with an object 122 stores object information associated with the object 122 and provides the object information to content capture device 110 during content capture.

In one embodiment, for example, an information sensor 124 associated with an object 122 stores information adapted for use in retrieving object information associated with the object (e.g., a pointer to the location(s) of object information associated with the object 122, an identifier of the sensor 124 and/or object 122 which may be used to determine an address of a network location from which the object information associated with object 122 may be retrieved, and the like, as well as various combinations thereof). In such embodiments, the information sensor 124 is configured for providing the information adapted for use in retrieving object information associated with the object 122 to content capture device 110 during content capture.

In one embodiment, for example, an information sensor 124 associated with an object 122 may be configured for conveying other types of information associated with the object 122 (e.g., information adapted for use in associating a content tag with the object 122 represented within captured content, information adapted for use in associating an information structure with a content tag embedded within captured content including the object 122, and the like, as well as various combinations thereof).

It will be appreciated that an information sensor 124 may be configured in any other manner suitable for enabling object information associated with the object 122 to be obtained.

In general, a position sensor is a sensor adapted for enabling identification of the object 122 within captured content such that the content tag used for automatically tagging the object 122 within the captured content may be associated with the object 122 within the captured content.

For example, a position sensor 124 associated with an object 122 may be configured to enable determination of information such as object dimensions of object 122, object distance associated with object 122 (e.g., distance from the content capture device 110 to the object 122), and the like, which information may be processed for determining the position of the object 122 within the captured content (e.g., such that embedded content tags may be aligned with the objects 122 within the captured content).

Although primarily depicted and described herein with respect to embodiments in which information sensors 124 and position sensors 124 are separate physical sensors, it will be appreciated that at least some sensors 124 may operate as both information and position sensors 124.

The sensors 124 may be any sensors suitable for operating as the information and/or position sensors as described herein. For example, the sensors 124 may be one or more of hardware-based, software-based, materials-based, and the like. For example, the sensors 124 may include sensors such as barcodes, Bokodes, QR Codes, active and/or passive Radio Frequency Identifiers (RFIDs), chemical tags and/or photosensitive tags, motes, voice indices, audio indices, video indices, and the like, as well as various combinations thereof.

The sensors 124 may include any other sensors suitable for use in providing these and various other functions associated with the content tagging and management capability.

The sensors 124 may be associated with objects 122 in any suitable manner (e.g., embedded within objects 122, affixed to objects 122, and the like). The sensors 124 may be embedded within objects 122 in any suitable manner, may be affixed to objects in any suitable manner, and the like, as will be understood by one skilled in the art.

The sensors 124 may be associated with objects 122 at any suitable time, which may depend on the type of objects 122 with which the sensors 124 are associated.

For example, for manufactured objects 122, sensors 124 may be associated with the manufactured objects 122 during manufacturing, after manufacturing but prior to sale of the objects 122 (e.g., such as where a vendor affixes sensors 124 to objects 122 prior to sale to customers), after sale of the objects 122 (e.g., such as where the owner of the object 122 purchases a sensor 124 and affixes the sensor 124 to the object 122), after sale of the objects 122 (e.g., such as where a third-party provider provides a sensor 124 and affixes the sensor 124 to the object 122), and the like, as well as various combinations thereof.

For example, for existing objects 122 (e.g., manufactured objects, structures, natural objects, and the like), the sensors 124 may be associated with the objects 122 by the people responsible for the objects 122 (e.g., the owner of the object 122, the person(s) responsible for or in control of the object 122 (e.g., the curator of a museum where the objects 122 are exhibits at the museum, the park supervisor where the objects 122 are natural objects as a park, and the like)), and the like.

The sensors 124 may be associated with objects 122 automatically (e.g., by machines during manufacturing of the objects 122, by machines after manufacturing of the objects 122, and the like).

The sensors 124 may be associated with objects 122 manually by any suitable person, which may depend on the type of objects 122 with which the sensors 124 are associated.

For example, an owner of a content capture device 110 may obtain sensors 124 so that the owner of the content capture device 110 may affix the sensors to various objects 122 of the owner (e.g., furniture, appliances, cars, and the like). This will enable automatic tagging of content generated by the owner of the content capture device 110 for objects owned by, or at least under the control of, the owner of the content capture device 110. This may enable the owner of the content capture device 110 and the sensors 124 to be remunerated where tagging of content including certain objects 122 is viewed by other users.

For example, a person who does not own a content capture device 110 may obtain sensors 124 and affix the sensors to objects 122 of the person (e.g., furniture, appliances, cars, and the like). This will enable automatic tagging of content generated by people using content capture devices 110 to capture content including the objects 122 of the user (e.g., friends taking photos or videos at the person's house using a content capture device 110). This may enable the owner of the sensors 124 to be remunerated where tagging of content including certain objects 122 is viewed by other users.

In such embodiments, sensors 124 may be obtained in any suitable manner. For example, sensors 124 may be included with the objects 122 when purchased, provided to the person by the entity from which the object 122 is obtained, purchased by the person independent of any objects 122 (e.g., such as where a sensor provider sells sensors suitable for use with objects 122), and the like, as well as various combinations thereof.

In one embodiment, in which sensors 124 may be purchased by the person independent of any objects 122, any suitable number of sensor types may be supported. In one embodiment, for example, one type of sensor 124 may be available independent of the type of object 122. In one embodiment, multiple types of sensors 124 may be available (e.g., from one or more sensor providers). In one such embodiment, the type of sensor 124 that must or should be used with a particular object 122 or type of object 122 may be recommended by the provider of the object 122, the object 122 or type of object 122 for which particular types of sensors 124 must or should be used may be recommended by the provider(s) of the sensors 124, and the like, as well as various combinations thereof. In other words, any suitable type(s) of sensors 124 may be used for providing the content tagging and management capability.

The sensors 124 may be associated with objects 122 in any other suitable manner.

The sensors 124 securely store object data associated with the objects 122 with which the sensors 124 are associated, respectively. As described herein, the object data that is stored on a sensor 124 associated with an object 122 may include position information associated with the object 122 and/or object information associated with the object 122.

The object data associated with an object 122 may be input into the associated sensor 124 at any suitable time(s) (similar to the ability of the sensor 124 to be associated with the object 122 at any suitable time(s)).

For example, where the sensor 124 is intended for association with a particular object 122 (e.g., where the sensor 124 is embedded within the object 122 during manufacturing, associated with the object 122 by the manufacturer of the object or the vendor of the object, and the like), the object data associated with the object 122 may be input into the sensor 124 at the time at which the sensor 124 is manufactured, after the sensor 124 is manufactured but prior to the sensor 124 being provided to the manufacturer or vendor of the object 122, by the manufacturer or vendor of the object 122, and the like.

For example, where the sensor 124 is not intended for association with a particular object 122 (e.g., where the sensor 124 is a generic sensor that is available to a person that owns or has control over the object 122), the object data associated with the object 122 may be input into the sensor 124 prior to being associated with the object 122, after being associated with the object 122, and the like. For example, a person may purchase sensors 124, load object data into the sensors 124 based on the objects 122 with which the sensors 124 are to be associated, and then affix the sensors 124 to objects 122. Similarly, for example, a person may purchase sensors 124, affix the sensors 124 to objects 122, and then load object data into the sensors 124 based on the objects 122 with which the sensors 124 are associated.

The object data associated with an object 122 may be input into the associated sensor 124 at any other suitable time(s).

The object data associated with an object 122 may be input into the associated sensor 124 automatically (e.g., via machine to machine transfer of the object data into the sensor 124).

The object data associated with an object 122 may be input into the associated sensor 124 manually by any suitable person, which may depend on the type of objects 122 with which the sensors 124 are associated (similar to the ability of the sensor 124 to be associated with the object 122 manually by any suitable person).

In one embodiment, object data associated with an object 122 may be input into the associated sensor 124 using the sensor scanner 130.

The sensor scanner 130 may be any scanner suitable for interfacing with sensors 124 with secure read and write capabilities, e.g., for reading data from sensors 124, for input data into sensors 124, and the like, as well as various combinations thereof.

The sensor scanner 130 may obtain object data, associated with an object 122 and intended to be input into the sensor 124 that is associated with the object 122, in any suitable manner.

In one embodiment, sensor scanner 130 includes a user interface via which a user may securely, and on demand, enter object data intended to be securely loaded into sensors 124.

In one embodiment, sensor scanner 130 includes one or more communication interfaces for interfacing with one or more devices from which object data, intended to be securely loaded into sensors 124, may be obtained.

In one such embodiment, sensor scanner 130 may include one or more wired and/or wireless connection capabilities, including non-networked and/or networked connection capabilities, for enabling sensor scanner 130 to communicate with one or more user devices securely. For example, sensor scanner 130 may be connected to one or more user devices directly (e.g., using one or more of Peripheral Component Interconnect (PCI), Universal Serial Bus (USB), and the like, as well as combinations thereof). For example, sensor scanner 130 may be connected to one or more user devices via a wired network connection (e.g., via Ethernet or any other suitable wired network connection). For example, sensor scanner 130 may be connected to one or more user devices wirelessly (e.g., using Bluetooth, WiFi, Radio Frequency (RF), Ultraviolet (UV), Visual Spectrum (VS), and the like). These and other connection capabilities are represented as communication path 131 in FIG. 1.

In one such embodiment, sensor scanner 130 may include one or more wired and/or wireless connection capabilities for enabling sensor scanner 130 to communicate with one or more network devices (e.g., network servers storing object data for objects 122, network databases storing object data for objects 122, and the like, as well as various combinations thereof). For example, sensor scanner 130 may communicate with one or more network devices via one or more of Ethernet, WiFi, cellular, and the like, as well as various combinations thereof. These and other connection capabilities are represented as communication paths 131 and/or 132 in FIG. 1 (e.g., path 131 where the content capture device 110 accesses remote network environment 150 via local network environment 140; path 132 where the content capture device 110 accesses remote network environment 150 directly).

The object data for an object 122 may be securely obtained by sensor scanner 130 and securely loaded into a sensor 124 using sensor scanner 130 in any suitable manner.

In one embodiment, for example, a user enters object data for an object 122 into a user device of the user (e.g., a computer). The user then downloads the object data from the computer into the sensor scanner 130 using any suitable communication/interfacing technologies. The user may then use the sensor scanner 130 to input the object data into the sensor 124 that is associated with the object 122.

In one embodiment, in which a user enters object data for an object 122 into a user device (e.g., sensor scanner 130, computer 142, and the like), one or more templates may be made available to the user for inputting the information. The templates may be created by any suitable source (e.g., the provider/manager of the object 122, one or more third party template providers, and the like, as well as various combinations thereof). The templates may be provided to the user by any suitable source (e.g., the provider/manager of the object 122, one or more third party template providers, and the like, as well as various combinations thereof). The templates may be provided to the user at any suitable time (e.g., with the object 122 such as when a user purchases the object 122, with the sensor 124 such as where the owner of the object purchased one or more sensors 124 for the object 122, from one or more network servers from which the user may download one or more templates, and the like, as well as various combinations thereof). For example, templates may be stored on servers operated by one or more of commercial entities $153_1$, third party brokers $153_2$, application providers $153_3$, and federated agency $153_4$. The templates may be provided at any suitable level of granularity (e.g., one or more templates may be provided for specific objects 122, one or more templates may be provided for specific object types, one or more templates may be provided as generic templates which can capture object data for all or at least some types of objects, and the like, as well as various combinations thereof). The templates may be configured in any suitable manner for enabling the user to enter information (e.g., using one or more forms, using a survey format in which the user answers questions designed to elicit the object information, using a prompting format in which the user is prompted to enter the object information, and the like, as well as various combinations thereof). The users which may use such templates for entering object information to be securely loaded into a sensor 124 may include any suitable users (e.g., an employee of a provider of the object 122 for which the object information is to be securely loaded into the sensor 124, an employee of a third party service that enters the object information that is to be securely loaded into the sensor 124 on behalf of the provider of the object 122, the owner/manager of the object 122 that uses sensor scanner 130 for loading the entered object information into the sensor 124, and the like, as well as various combinations thereof).

In one embodiment, for example, a user initiates, via sensor scanner 130, a request for object data for an object 122 where the object data is securely stored on a user device or a network device. The sensor scanner 130 receives and stores the requested object data. The user may then use the sensor scanner 130 to input the object data into the sensor 124 that is associated with the object 122.

In this manner, various embodiments are provided in which the sensors 124 (and, thus, the object data stored by the sensors 124) are writable and readable by intended devices only (e.g., the sensors 124, and the associated object data stored on the sensors 124, may be secured such that only devices determined to be authorized based on permissions are able to interact with the sensors 124).

Similarly, in this manner, various embodiments are provided in which the sensor scanner 130 is enabled to operate with a pre-defined set of sensors 124, devices (computer 142, adjunct devices 143, and the like), and/or network environments (e.g., local network environment 140 and/or remote network environment 150) based assigned various assigned permissions.

From the foregoing descriptions of the various ways in which object data for an object 122 may be securely obtained by sensor scanner 130 and securely loaded into a sensor 124 using sensor scanner 130, it will be appreciated that the content tagging and management capability is not intended to be limited to or by any particular mechanism or method by which object data for an object 122 may be securely obtained by sensor scanner 130 and securely loaded into a sensor 124 using sensor scanner 130.

The object data, for an object 122, that is stored on a sensor 124 may include any suitable types and/or amount of data associated with the object 122.

In one embodiment, the object data, for an object 122, stored on a sensor 124 includes position information for the object 122 (e.g., stored in a position sensor 124 or a combination position/information sensor 124). The position information for the object 122 may include any information suitable for use in determining the position of the object 122 within captured content. For example, the position information may include a GPS location of the object 122, information indicative of the position of the object 122 relative to one or more reference points (e.g., one or more other objects 122 which may or may not have sensors 124 associated therewith and/or any other suitable reference point(s)), information indicative of one or more dimensions of the object 122, and the like, as well as various combinations thereof.

In one embodiment, the object data, for an object 122, that is stored on a sensor 124 includes object information adapted for inclusion within the information structure that is associated with captured content that includes the object 122 (e.g., stored in an information sensor 124 or a combination information/position sensor 124).

The object information, for an object 122, that is stored on a sensor 124 may include any suitable information associated with the object 122, which will vary for different types of objects 122. The object information may include information provided by the provider/manager of the object 122, information provided by the owner of the object 122, and the like, as well as various combinations thereof. The types of object information which may be stored on a sensor 124 may be better understood by way of reference to some specific examples.

In one embodiment, for example, the object information, of an object 122, that is stored on a sensor 124 includes objective information describing the object 122. For example, where the object 122 is a refrigerator, the object information included within the sensor 124 associated with the refrigerator may include the types of information most likely to be of interest to people reviewing information about a refrigerator (e.g., the dimensions of the refrigerator, the capacity of the refrigerator, features of the refrigerator, and the like, as well as various combinations thereof). For example, where the object 122 is a television, the object information included within the sensor 124 that is affixed to the television may include the types of information most likely to be of interest to people reviewing information about a television (e.g., type of technology used (e.g., plasma, LCD, and the like), the dimensions, display information (e.g., diagonal size, technology, resolution, and the like), video features, multimedia capabilities supported, Electronic Programming Guide (EPG) information associated with the video service connection, warranty information, and the like, as well as various combinations thereof). For example, where the object 122 is a painting displayed in a museum, the object information included within the sensor 124 that is associated with the painting may include the types of information most likely to be of interest to people viewing the painting (e.g., the name of the artist, the name of the painting, a brief history of the artist and or the painting, and the like, as well as various combinations thereof). The foregoing examples are merely a few examples of the types of object information which may be stored on sensors 124. The various types of object information that may be considered to be relevant for other types of objects will be understood.

In one embodiment, for example, the object information, for an object 122, that is stored on a sensor 124 includes subjective and/or personal information associated the object 122. For example, where the object 122 is a television, the object information included within the sensor 124 that is affixed to the television may include information such as the date of purchase by the owner of the television, the place of purchase by the owner of the television, the deal that the owner got on the television, a review of the television by the owner, the types of content that the owner likes to watch on the television, and the like, as well as various combinations thereof. For example, where the object 122 is a painting displayed in a museum, the object information included within the sensor 124 that is associated with the painting may include information such as an opinion of the curator as to the importance of the painting, an opinion of the curator as to the quality of the painting, an opinion of the curator as to other paintings that a person may like if they like that painting, and the like, as well as various combinations thereof. The various types of subjective and/or personal information that may be considered to be relevant for other types of objects will be understood.

It will be appreciated, at least from the foregoing examples, that virtually any object information may be stored on a sensor 124 for an associated object 122 (e.g., descriptions of the object, advertisements for the object and/or related objects, opinions about the object, links to additional information about the objects, and the like, as well as various combinations thereof).

Similarly, it will be appreciated, at least from the foregoing examples, that the object information may include one or more types of content (e.g., text, images, audio, video, multimedia, and the like, as well as various combinations thereof).

The object information that is stored on a sensor 124 for an object 122 may be configured on the sensor 124 by any suitable source(s) of such information, e.g., the provider/manager of the object 122, an entity on behalf of the provider/manager of the object 122 (e.g., such as where a company that sells the object 122 provides the object information to the manufacturer of the object 122 for inclusion on sensor 124, such as where a company that sells the object 122 provides the information to a third party responsible for loading the object information onto the sensor 124, and the like), the owner/manager of the object 122 via sensor scanner 130 (e.g., such as where the owner/manager supplements object information already stored on the sensor 124 and/or provides all of the object information that is stored on the sensor 124), and the like, as well as various combinations thereof.

The object information, for an object 122, which is stored on a sensor 124 may include any other suitable information.

The object data, for an object 122, which is stored on a sensor 124 may include any other suitable object data.

Although depicted and described with respect to embodiments in which the object data for an object 122 is stored on a sensor associated with the object 122, it will be appreciated that some or all of the object data for the object 122 (e.g., one or more of position information, object information, and the like, as well as various combinations thereof) may be obtained from one or more other sources of such object data. In this manner, the various types of object data described herein as being included within the sensors 124 for objects 122 may be considered to be more generally associated with the sensors 124 as the object data may be obtained from any suitable source(s) of such object data.

In one embodiment, for example, the object data (of an object 122) that is stored on a sensor 124 includes data adapted for use in retrieving object data associated with object 122 (e.g., to retrieve one or more of position information, object information for inclusion within the information structure, and the like, as well as various combinations thereof). For example, the data adapted for use in retrieving object data associated with object 122 may include an identifier of the object 122, which may be used to retrieve object data associated with object 122. For example, the data adapted for use in retrieving object data associated with object 122 may include one or more identifiers and/or addresses of devices from which object data may be retrieved (e.g., the computer 142, one or more adjunct devices 143, one or more network devices of remote network environment 150, and the like, as well as various combinations thereof). The data adapted for use in retrieving object data associated with object 122 may include any other information suitable for use in retrieving object data for object 122 from a source other than its associated sensor 124. In such embodiment, it will be appreciated that retrieval of the object data may be performed securely.

The object data associated with an object 122 may be retrieved from any suitable source of such information (e.g., a memory on content capture device 110, one or more devices within local network environment 140, one or more devices within remote network environment 150, and the like, as well as various combinations thereof).

Although primarily depicted and described with respect to various embodiments in which object data is stored on sensors 124, in at least one other embodiment the sensors 124 only store sensor identification information suitable for use in uniquely identifying the sensor. In such embodiments, the sensor identification information may be used to retrieve associated object data for the object 122 with which the sensor 124 is associated (similar to the use of object identification information to retrieve object data as described herein). In such embodiments, for example, a mapping of a sensor 124 to its object 122 may be maintained (e.g., in any suitable source, such as on content capture device 110, in a device of local network environment 140, in a device of remote network environment 150, and the like, as well as various combinations thereof) such that the object 122 with which the sensor is associated can be determined and the associated object data of the object 122 can be obtained for use in automatically tagging content including that object 122. It will be appreciated that other similar arrangements are contemplated.

The sensors 124 may securely store object data in encrypted form. In one embodiment, all of the object data that is stored on a sensor 124 is encrypted. In one embodiment, a subset of the object data that is stored on a sensor 124 is encrypted. In such embodiments, the object data may only be available to the content owner (e.g., the provider of the object 122 where the provider controls the object data associated with the object 122, the owner or manager of the object 122, and the like). In such embodiments, the object data encryption may be fully or partially removed after the activation of the sensor 124 by an authorized person.

The sensors 124 may have one or more permission levels associated therewith. The permission levels for sensors 124 may be used to control storage of object data on the sensors 124 and/or reading of object data from the sensors 124, thereby enabling secure storage of object data on the sensors 124 and/or secure reading of object data from the sensors 124. The permission(s) may be set at any suitable level (e.g., for the sensor 124, for all object data stored on the sensor 124, for one or more subsets of object data stored on the sensor 124, and the like, as well as various combinations thereof). The permission levels for sensors 124 may include any suitable levels. In one embodiment, for example, three permission levels may be supported as follows: owner, group, and public. In this embodiment, the "owner" permission level indicates that only the owner of the sensor 124 may securely store object data on and/or securely retrieve object data from the sensor 124, the "group" permission level may be used to specify one or more groups of users (each group including one or more users) that may securely store object data on and/or securely retrieve object data from the sensor 124, and the "public" permission level indicates that any user may securely store object data on and/or securely retrieve object data from the sensor 124. It will be appreciated that these permission levels are merely exemplary, and that any other suitable numbers and/or types of permission levels may be supported. It will be appreciated that different numbers and/or types of permission levels may be used for different sensors 124.

A sensor 124 may provide the stored object data of an object 122 to the content capture device 110 during or contemporaneous with content capture by the content capture device 110, when the captured content includes the object 122. The sensors 124 provide the stored object data of objects 122 to the content capture device 110 in any suitable manner, which may depend on the type of sensors 124. In one embodiment, sensors 124 provide (or do not provide) the stored object data of objects 122 to the content capture device in accordance with one or more permission levels set for the sensors 124.

As described herein, the automatic tagging capability may be provided by and/or supported by local network environment 140 and/or remote network environment 150.

The local network environment 140 includes one or more user devices and associated communication capabilities for a user of content capture device 110. For example, the local network environment 140 may be a home environment of a user, an enterprise environment of a user, and the like.

As depicted in FIG. 1, local network environment 140 includes a local network 141, a computer 142, adjunct devices 143, and local storage 144.

The local network 141 may facilitate communications within local network environment 140 (e.g., between computer 142 and adjunct devices 143) and/or between local network environment 140 and remote network environment 150 (e.g., enabling computer 142 and/or adjunct device to communicate via remote network environment 150).

The computer 142 includes any computer which may be used by a user in conjunction with the content tagging capability. For example, computer 142 may be a desktop or laptop computer in a home or office of the user.

The computer 142 may be used by the user to configure sensors 124 which are placed on objects 122 owned by or at least under the control of the user. For example, the user may set permissions associated with sensors 124, input information to be stored as object data on sensors 124, and the like. The user may then download the configured information into sensor scanner 130 and use sensor scanner 130 to configure the associated sensors 124.

The computer 142 may be used by the user to configure information that is associated with information structures that are associated with objects in captured content, which may include content captured by the user and/or by other people.

For example, computer 142 may run one or more local programs via which the user may enter information for objects 122 such that the entered information may be stored in the information structures that are automatically associated with the objects 122 in the captured content. In this example, the entered object information may be stored in any suitable location (e.g., on the computer 142, on adjunct devices 143, on local storage 144, on content capture device 110, on one or more network devices of remote network environment 150, and the like, as well as various combinations thereof).

For example, computer 142 may be used to access one or more online information management systems via which the user may enter information for objects 122 such that the entered information may be stored in the information structures that are automatically associated with the objects 122 in the captured content. In this example, as with the previous example, the entered object information may be stored in any suitable location.

In the foregoing examples, the user is able to use the computer 142 to securely define object information which will be automatically associated with objects 122 in captured content. As described herein, sensors 124 may be placed on myriad numbers and types of objects 122 and, thus, many different types of users may use computer 142 for this purpose in many different ways. For example, the user may be an owner of objects 122 and may wish to enter information about the objects 122. For example, the user may work at a museum (e.g., objects 122 are exhibits at the museum) and may wish to enter information about the exhibits of the museum. It will be appreciated that these examples are merely a few exemplary uses of computer 142 to securely define information which will be automatically associated with objects 122 in captured content.

The computer 142 may be used by the user for performing various other functions of the content tagging capability.

The adjunct devices 143 include any device or devices which may be used by a user in conjunction with the content tagging capability. For example, adjunct devices 142 may include one or more of a computer, a set-top box, an access point, a storage/cache device, a storage area network (SAN), and the like, as well as various combinations thereof.

The computer 142 and adjunct devices 143 each have access to local storage 144, which may be provided in addition to and/or in place of any storage available on computer 142 and/or one or more of adjunct devices 143.

It will be appreciated that local network environment 140 may include fewer or more devices and/or communications capabilities, and may be arranged in any other suitable manner.

In various embodiments, one or more of the devices of the local network environment 140 may perform various functions of the content tagging capability (e.g., performing processing for populating the information structure(s) with information about the associated object(s) 122, performing processing for associating the information structure(s) with captured content, storing content that has been automatically tagged by other devices, and the like, as well as various combinations thereof).

The remote network environment 150 includes a service provider network 151, Internet 152, a number of entities 153, a cloud computing infrastructure 154, and a CMS 155 (CMS) 155.

The service provider network 151 provides access from local network environment 140 to Internet 150, such that the devices of local network environment 140 and the entities 153 of remote network environment 150 may communicate.

The entities include commercial entities $153_1$, third party brokers $153_2$, application providers $153_3$, and a federated agency $153_4$, (collectively, entities 153). The entities 153 may include fewer or more entities 153.

The commercial entities $153_1$ may include any commercial entities which may be associated with the content tagging and management capability. For example, the commercial entities $153_1$ may include providers of objects 122 which are or may have sensor 124 associated therewith. The commercial entities $153_1$ may operate systems from which information may be accessed in conjunction with the content tagging and management capability (e.g., object information for storage on the sensors 124, object information for storage in the information structure that is associated with an object 122 when the captured content including the object 122 is automatically tagged, object information available in response to selection of tags embedded within tagged content including objects 122, and the like, as well as various combinations thereof). Although omitted for purposes of clarity, it will be appreciated that some or all of the commercial entities $153_1$ may operate their own systems for making such information available for use with the content tagging and management capability.

The third party brokers $153_2$ may include any third party entities which may be associated with the content tagging and management capability. For example, third party brokers $153_2$ may include brokers which provide sensors 124, brokers which associate sensors 124 with objects, brokers which supply object information for use with the content tagging and management capability (e.g., for configuring sensors 124, for responding to selection of tags embedded within captured content, and the like), brokers that facilitate remuneration based on viewing of tagged content, and the like, as well brokers providing various combinations of such services. The third party brokers $153_2$ may operate systems from which information may be accessed in conjunction with the content tagging and management capability. Although omitted for purposes of clarity, it will be appreciated that some or all of the third party brokers $153_2$ may operate their own systems for making such information available for use with the content tagging and management capability.

The application providers $153_3$ may include any application providers which may provide applications suitable for use in enabling the content tagging and management capability. For example, the application providers $153_3$ may provide applications configured for use in defining object information for storage on the sensors 124, applications configured for use in defining the format of information structures to be associated with content tags in captured content, applications configured for use in populating information structures with object information accessible via content tags with which the information structures are associated, applications configured for use by content owners in managing automatically tagged content (e.g., organizing automatically tagged content, setting permissions for controlling access to automatically tagged content or portions of automatically tagged content, and the like), applications for use by parties associated with remuneration of users based on reviewing of automatically tagged content (e.g., users for managing their remuneration accounts, commercial entities for managing remuneration of users, and the like), and like applications or any other applications suitable for use with the content tagging and management capability, as well as various combinations thereof.

The federated agency $153_4$ may operate to provide overarching control and management functions for providing the content tagging and management capability, enabling users and entities to interface in ways that support the content tagging and management capability.

The cloud computing infrastructure 154 is a managed, hosted, or shared data center based infrastructure, which can be a private or public cloud. In cloud computing infrastructure 154, various tagged content management capabilities may be provided. For example, tagged content may be transmitted via service provider network/access mechanisms, tagged content may be securely stored or accessed by the user or his or her extended group of contacts, the tagged content itself may be able to "push" the tagged content to user devices when tagged content is accessed, and the like, as well as various combinations thereof.

The CMS 155 is configured for providing various management functions of the content tagging and management capability, including providing management of content tagging and/or management of tagged content. For example, CMS 155 may provide management functions such as providing registration management functions (e.g., managing registration of users, sensors, scanners, entities, providers, advertisers, and the like), automatic content tagging and tagged content management functions (e.g., management of sensor permissions, permissions validation during automatic content tagging related activities, tagged content ownership management functions, management of tagged content permissions, and the like), tagged content delivery management functions (e.g., managing permissions associated with tagged content, managing other criteria associated with access to tagged content, and the like), tagged content advertising management functions (e.g., advertiser management functions, tagged content performance tracking functions, user remuneration management functions, and the like), and the like, as well as various combinations thereof. It will be appreciated that various functions performed by CMS 155 may fall into multiple such categories of management functions. It will be further appreciated that the various management functions described herein may be organized in various other ways.

In one embodiment, CMS 155 is configured to provide registration management functions.

In one embodiment, users may be registered with the CMS 155. For example, the users may be users of content capture devices used for generating tagged content, users of devices of local network environments, users that own or are responsible for objects tagged with sensors, users that own or are responsible for sensors associated with objects, users of sensor scanners used to load data onto sensors, users that access tagged content, and the like. The users may be registered for any suitable purposes, such as account management, permissions management, content management, remuneration of users, and the like, as well as various combinations thereof. The registered users may have user accounts associated therewith, which may include user profiles associated with the users, user content generated by the users, and the like.

In one embodiment, entities may be registered with the CMS 155. For example, entities may include entities such as commercial entities $153_1$, third-party brokers $153_2$, application providers $153_3$, object providers/controllers, sensor providers, sensor scanner providers, object data template providers, information structure template providers, entities which may be involved in remuneration based on tagged content, and the like, as well as various combinations thereof.

In one embodiment, sensors 124 may be registered with the CMS 155. In one embodiment, sensors 124 may be registered with the CMS 155 by the provider of the sensor 124. In one embodiment, sensors 124 may be registered with the CMS 155 by the provider of the object 122 with which the sensor 124 is associated. In one embodiment, sensors 124 may be registered with the CMS 155 by the owner of the object 122 (e.g., prior to or after activating the sensor 124 with sensor scanner 130). In one embodiment, sensors 124 may be registered with the CMS 155 by multiple such parties, where the registration of the sensor 124 is updated as the sensor passes from one party to the next. For example, a sensor 124 may initially be registered with the CMS 155 by the provider of the object 122 with which the sensor 124 is associated, and the owner of the object 122 may then access the registration of the sensor 124 and take control of that registration for purposes of controlling access to the sensor 124. In one embodiment, manufacturers have the capability to enable and disable sensors 124 from working and, after a user purchases the sensor 124 or an object 122 having the sensor 124 associated therewith the user can then enable the sensor 124 based on a registered user profile of the user (e.g., which may be registered with the CMS 155). The sensors 124 may be registered for enabling management functions such as loading of object data on sensor 124, controlling which user(s) may access the object data on sensor 124 during content capture, and the like, as well as various combinations thereof. The management of sensors 124 using the CMS 155 may be provided in any other suitable manner.

In one embodiment, sensors scanners (e.g., sensor scanner 130) may be registered with the CMS 155. The sensor scanners may be registered with the CMS 155 by the providers of the sensor scanner (e.g., prior to sale or deployment of the sensor scanners), by owners of the sensor scanners (e.g., after purchase and activation of the sensor scanners), and the like, as well as various combinations thereof. The sensor scanners may be registered for enabling management functions such as controlling access to sensors 124, controlling loading of object data on sensors 124, and the like, as well as various combinations thereof. The management of sensor scanner 130 using the CMS 155 may be provided in any other suitable manner.

Although depicted and described herein with respect to embodiments in which registration and management of users, entities, devices, and the like is performed via the CMS 155, it will be appreciate that registration and management of users, entities, devices, and the like may be performed by any other management systems and/or any other entities.

In one embodiment, CMS 155 is configured to provide automatic content tagging and tagged content management functions.

The automatic content tagging management functions may include any functions related to the process of automatically generating tagged content. For example, automatic content tagging management functions may include providing various permissions checking functions associated with generation of automatically tagged content, enabling object providers/controllers access for modifying object information (e.g., object description information, advertising information, and the like) that is ultimately included within information structures during automatic content tagging, enabling third party providers access for managing associated third party information and services, and the like, as well as various combinations thereof.

The tagged content management functions may include any functions related to the process of managing tagged content.

In one embodiment, the tagged content management functions may include managing storage of tagged content (which may include management of some or all of the constituent parts of tagged content, such as where tagged content, content tags, and/or information structures are maintained as separate content structures).

In one embodiment, the tagged content management functions may include enabling tagged content owners access for managing their tagged content (e.g., modifying permissions, controlling distribution of tagged content, and the like).

In one embodiment, the tagged content management functions may include tagged content ownership management functions.

In one embodiment, when a tagged content item is generated by a user, the tagged content item is associated with the user such that the user is always identified as the owner of the content item, even regardless of its distribution. This will enable remuneration of users for the tagged content that they generate, even where such tagged content is copied and distributed via various content distribution mechanisms such as content posting sites (e.g., Flickr, YouTube, and the like), social networking sites (e.g., Facebook, Twitter, and the like). This provides a significant motivation to users to capture content in interesting ways which may allow them to receive remuneration where such content "goes viral" at least because the users will be guaranteed that proper tracking of content ownership will enable them to receive the proper amount of remuneration. The management of tagged content ownership in this manner also may provide various other advantages.

In one embodiment, a content owner can modify the ownership of tagged content via the CMS 155. This enables an owner of tagged content to transfer ownership of tagged content to one or more other users (e.g., for enabling those users to manage the tagged content, as part of a business agreement, or for any other purpose(s)).

In one embodiment, CMS 155 is configured to provide tagged content delivery management functions for managing delivery of tagged content.

In one embodiment, a content owner can modify the content usage permissions of tagged content via the CMS 155. The content usage permissions control distribution of tagged content. The content usage permissions may be modified using any granularities for tagged content (e.g., on a per content item basis, for groups of content items owned by the content owner, for all content items owned by the content owner, and the like), users (e.g., on a per-user basis, for groups of users for which the content owner sets permissions, for all users for which the content owner sets permissions, and the like), and the like, as well as various combinations thereof.

In one embodiment, access to tagged content by a user other than the owner of the tagged content is controlled based on whether the user is offline or online when the user is attempting to access the content (e.g., whether or not the user device via which user is attempting to access the tagged content has network connectivity).

In this embodiment, access to a tagged content when the user is offline may be provided at any suitable level of granularity. In one embodiment, for example, when the user is offline, the tagged content is encrypted such that the tagged content cannot be accessed by the user. In one embodiment, for example, when the user is offline, the embedded tag(s) within the tagged content item is encrypted such that the user is able to access the content item while offline, but cannot access the embedded tag and, therefore, cannot access the information structure(s) associated with the content tag(s). In one embodiment, for example, when the user is offline, portions of the information structure(s) associated with the embedded tag(s) of the content item are encrypted such that the user is able to access the content item while offline, including some but not all of the information associated with the information structure(s) of the content item.

In this embodiment, when the user is online, access to the tagged content is enabled, although such access may be restricted in other ways (e.g., based on permissions associated with the content item or portions of the content item, based on permissions set for the user, and the like, as well as various combinations thereof).

In such embodiments, the determination of whether or not a user requesting access to tagged content is online or offline may be performed in any suitable manner (e.g., an online/offline indicator may be maintained by the CMS 155 for each user and may be updated as users go online and offline, by pinging the user device of the user to test for network connectivity, and the like, as well as various combinations thereof).

In one embodiment, an online/offline status update indicator is used as a facilitator for management of tagged content. In one such embodiment, the online/offline status update indicator is used to keep (i) the local updates to the original content permissions from the owner to his/her local updates in synch with CMS 155, and (ii) synch tagged content offline requests to take place when the requesting users come online.

In one embodiment, CMS 155 is configured to provide tagged content advertising management functions (e.g., advertiser management functions, tagged content performance tracking functions, user remuneration management functions, and the like).

In one embodiment, CMS 155 is configured to provide advertiser management functions, for enabling advertisers to control advertising via tagged content.

In one embodiment, for example, a provider of an object can modify object information associated with a particular object type via the CMS 155. The control of such object information in a centralized manner enables the provider of the object to modify at least a portion of the object information that is presented to users upon selection of embedded tags associated with the object type. This may be useful for providing targeted advertising for a particular object. For example, a car manufacturer may maintain an account on the CMS 155 for purposes of providing advertising management. In this example, for each make and model of car produced by that car manufacturer, the CMS 155 may store a link to a webpage including information about that particular make and model of car, such that, by modifying the links stored on CMS 155, the car manufacturer can ensure that automatically tagged content is generated using the latest links configured for directing users to the latest information about each of the various cars manufactured by the car manufacturer. This enables the car manufacturer to entice anyone viewing the object information associated with the tagged content to purchase the latest version of that car.

In one embodiment, for example, a provider of a product(s) may advertise, via the CMS 155, information regarding a product(s) that the provider would like to promote. The advertiser could then indicate to users of CMS 155 (e.g., users having accounts on CMS 155, and which generate content using the content tagging and management capability and/or manage tagged content via CMS 155) the types of remuneration that the provider is willing to provide based on performance of tagged content including the associated product(s) of the provider. In this manner, the provider can motivate users to try to generate tagged content featuring their products in interesting ways which are likely to be viewed by a large number of other users who might ultimately purchase the product(s). The product providers would then be able to reward users for promoting their products while reducing their overall advertising budget typically used on traditional advertising that typically is not even guaranteed to be presented to any particular number of people.

In one embodiment, CMS 155 is configured to track the performance of tagged content. In one embodiment, for example, CMS 155 may be configured to track tagged content performance information, e.g., the number of times each item of tagged content is viewed, the number of unique views for each item of tagged content, and the like, as well as various combinations thereof.

In one embodiment, CMS 155 is configured to manage remuneration of owners of tagged content based on the performance of tagged content (e.g., updating the amount of remuneration to which the content owner is entitled, collecting remuneration credits from various sources on behalf of content owners entitled to such remuneration, and the like, as well as various combinations thereof). In such embodiments, various accounts managed on CMS 155 may be linked to various other accounts (e.g., credit accounts, bank accounts, and the like, as well as various combinations thereof).

It will be appreciated that CMS 155 may be configured to provide various other management functions in support of the content tagging and management capability.

Although depicted and described as being a standalone system, in one embodiment CMS 155 may be hosted by one or more of the entities 153. In one embodiment, for example, CMS 155 may be hosted by federated agency 153₄.

It will be appreciated that any of the management functions of CMS 155 depicted and described herein may be implemented using any suitable algorithms for providing such functions, such that the various management functions of CMS 155 depicted and described herein also may be considered to be steps of algorithms which CMS 155 is configured to execute to provide such management functions.

As described herein, the content tagging and management capability, as supported by content tagging system 100, enables automatic tagging of an object in captured content.

As described herein, the automatic tagging of an object in captured content results in the embedding, within the captured content, of a content tag such that the content tag is associated with the object within the captured content, and where the content tag has associated therewith an information structure storing information associated with the tagged object.

In one embodiment, the automatic tagging of an object in captured content includes (1) associating of a content tag with the object within the captured content and (2) associating of an information structure to the object in the captured content, via an association of the information structure to the content tag associated with the object.

In one embodiment, the automatic tagging of an object in captured content includes (1) associating of an information structure to a content tag and (2) associating of the content tag within captured content such that the content tag is associated with the object within the captured content, to form thereby tagged content having the information structure associated therewith.

In such embodiments, the associating of a content tag with the object within the captured content may be performed in any suitable manner. In one embodiment, associating of the content tag within captured content includes determining a position of the object 122 within the captured content and associating the content tag with the object 122 at or near the position of the object 122 within the captured content. The position of the object 122 within captured content may be determined using any suitable information (e.g., position information indicative of the position of the object 122, dimension information indicative of one or more dimensions of the object 122, and the like, as well as various combinations thereof), which may be obtained from any suitable source of such information (e.g., received as part of the object data from the sensor(s) 124, obtained using object data received from the sensor 124, and the like, as well as various combinations thereof). The actual embedding of the content tag within the captured content may be performed in any suitable manner, as will be understood by one skilled in the art.

In such embodiments, the content tags may include any suitable types of content tags, which may vary based on one or more factors, such as the type of content, type of objects, market segment, and the like, as well as various combinations thereof. The content tags may have any suitable characteristics associated therewith. For example, the content tags may use any suitable shapes, sizes, colors, and the like. For example, the content tags may be visible at all times, visible only during mouse-over, and the like, as well as various combinations thereof. The content tags associated with objects within captured content to form tagged content may include any other suitable types of content tags.

In such embodiments, the automatic association of an information structure to the object 122 in the captured content, via an association of the information structure to a content tag associated with the object 122, may be performed in any suitable manner.

The information structure may be obtained from any suitable source (e.g., local memory of the device which is performing the processing for associating the information structure with the content tag, a device that is remote from the device which is performing the processing for associating the information structure with the content tag, and the like, as well as various combinations thereof). The information structure may be received from the remote source prior to content capture or during the processing for automatically tagging captured content.

The information structure may be the only information structure available for use, or may be selected from among a plurality of information structures available for use.

In one embodiment, for example, in which only a single information structure is available for use, the information structure may provide a template that is suitable for use in storing object information for any type of object (or at least any type of object for which automatic content tagging will or is expected to be performed).

In one embodiment, for example, in which multiple information structures are available for use, the information structure that is used may be selected in any suitable manner. In one such embodiment, for example, the information structure is one of a plurality of information structure templates, which may be selected based on one or more of the object type of the object 122 to be tagged, the sensor type of the sensor 124 associated with the object 122 to be tagged, an object identifier specific to the object 122 to be tagged, a sensor identifier specific to the sensor 124 associated with the object to be tagged, and the like. In one such embodiment, for example, the information structure is one of a plurality of information structures having object information stored therein, and the information structure may be selected based on one or more of the object type of the object 122 to be tagged, an object identifier specific to the object 122 to be tagged, a sensor identifier specific to the sensor 124 associated with the object to be tagged, and the like. It will be appreciated that one of multiple available information structures may be selected in any other suitable manner.

In such embodiments, the information structure stores information associated with the object 122, which may be accessed upon selection of the content tag embedded within the captured content.

As described herein, the information structure that is associated with the object 122 to form the tagged content may store any suitable object information that is associated with the object 122.

The object information for the object 122 may be stored within the information structure in any suitable manner.

In one embodiment, for example, at least a portion of the object information for the object 122 is stored in the information structure prior to content capture. In this case, association of the information structure to the object 122 in captured content thereby associates the object information with the object 122 in the captured content. In this case, the object information within the information structure may be supplemented with additional object information at the time of automatic content tagging (e.g., such as where additional object information received from the associated sensor 124 and/or determined using information received from the associated sensor 124 is added to the information structure) and/or after automatic content tagging is complete (e.g., such as where the content owner later modifies the object information stored within the information structure (e.g., via computer 142 or any other suitable device)).

In one embodiment, for example, at least a portion of the object information for the object 122 is stored in the information structure at the time of content capture. In this case, the object information may be stored in the information structure prior to, during, or after association of the information structure to the object 122 in the captured content to form the tagged content. In this case, the object information stored within the information structure may be obtained from any suitable source. For example, where the processing for automatic content tagging is performed by the content capture device, the object information stored within the information structure may be received at the content capture device from the associated sensor 124. For example, where the processing for automatic content tagging is performed by the content capture device, the object information stored within the information structure may be received at the content capture device from one or more other devices (e.g., such as where the object information is retrieved by the content capture device based on object information received by the content capture device from the sensor 124). For example, where the processing for automatic content tagging is performed by a device other than the content capture device, the object information stored within the information structure may be received from the content capture device (e.g., in addition to other object data received from the content capture device). For example, where the processing for automatic content tagging is performed by a device other than the content capture device, the object information stored within the information structure may be received from one or more other devices (e.g., from adjunct device 143 of local network environment 140, a network device of remote network environment 150, and the like). In such embodiment, in which the object information is received from one or more external sources, the object information may be received from the external sources in any suitable manner. In this case, the object information stored within the information structure may be supplemented with additional object information after automatic content tagging is complete (e.g., such as where the content owner later modifies the object information stored within the information structure (e.g., via computer 142 or any other suitable device)).

In one embodiment, the information structure that is associated with the object 122 to form the tagged content securely stores object information that is associated with the object 122.

In such embodiments, the information structure may be populated with object information in any suitable manner, as will be understood by one skilled in the art. In one embodiment, for example, the object information is parsed to identify the object information, corresponding fields of the information structure (i.e., those associated with the object information) are identified within the information structure, and the object data is populated in the corresponding fields within the information structure. In one embodiment, for example, object information may be organized such that the field(s) of the information for which the object information are intended are specified as part of the object information, such that the object information may then be stored in the appropriate field(s) of the information structure. It will be appreciated that association of object information with the appropriate fields of the information structure may be performed in any other suitable manner.

The object information for the object 122 may be stored within the information structure in any other suitable manner.

As described herein, automatic content tagging, via the automatic association of an information structure to an object 122 in captured content, may be performed by any suitable device or combination of devices.

In one embodiment, automatic association of an information structure to an object 122 in captured content is performed by the content capture device 110.

In this embodiment, the information structure may be obtained from any suitable source. In one embodiment, for example, the information structure is stored on the content capture device 110. In one embodiment, for example, the information structure is received at the content capture device 110 from one or more other devices (e.g., sensor 124, computer 142, adjunct devices 143, a network device of remote network environment 150, and the like, as well as various combinations thereof).

In this embodiment, automatic association of an information structure to an object 122 in captured content may be performed by content capture device 110 at any suitable time. For example, automatic association of an information structure to an object 122 in captured content may be performed by content capture device 110 at the time at which the captured content including the object 122 is captured, at a time after the time at which the captured content including the object 122 is captured, and the like, as well as various combinations thereof.

In this embodiment, the process of automatically associating an information structure to an object 122 in captured content may be initiated by content capture device 110 in response to any suitable trigger condition. For example, automatic association of an information structure to an object 122 in captured content may be initiated by content capture device 110 automatically at the time at which the content is captured (e.g., in response to detecting that content including an object was captured), automatically when the content is captured and the associated information structure is received at content capture device 110, automatically based on the level of activity on the content capture device 110 (e.g., at times are which the content capture device 110 is not currently being used), automatically by the content capture device 110 based on a schedule and/or threshold condition(s) (e.g., periodically after a certain amount of time has passed, after a threshold number of images have been captured, and/or based on any other suitable scheduling and/or threshold condition(s)), in response to a request initiated manually by a user via a user interface of content capture device 110, and the like, as well as various combinations thereof.

It will be appreciated that various combinations of such embodiments may be employed at content capture device 110 (e.g., for different objects 122 of a single item of captured content, for different items of captured content, and the like, as well as various combinations thereof) for enabling automatic association of an information structure to an object 122 in captured content by the content capture device 110.

In one embodiment, automatic association of an information structure to an object 122 in captured content is performed by a device or devices other than the content capture device 110.

In this embodiment, the captured content and object data is provided from content capture device 110 to the other device(s) which performs the processing for associating the information structure with the object 122 in the captured content to form the tagged content.

The captured content and object data may be provided from content capture device 110 to the other device(s) in any suitable manner.

In one embodiment, for example, the captured content and object data may be provided from content capture device 110 to the other device directly. In such embodiments, the direct transfer of the captured content and object data from content capture device 110 to the other device may be provided using any suitable communications capabilities. For example, where the other device is computer 142 or adjunct devices 143, the direct transfer of the captured content and object data may be made from content capture device 110 to computer 142 or adjunct devices 143 via a direct wired connection (e.g., such as where a camera or camcorder is plugged into the computer 142 or adjunct device 143 via a USB or other suitable port). For example, where the other device is computer 142 or adjunct devices 143, the direct transfer of the captured content and object data may be made from content capture device 110 to computer 142 or adjunct devices 143 via a wired networked connection. For example, where the other device is computer 142, adjunct devices 143, or a network device of remote network environment 150, the direct transfer of the captured content and object data may be made from content capture device 110 to computer 142, adjunct devices 143, or a network device of remote network environment 150 via a wireless connection (e.g., via Bluetooth, WiFi, or other suitable connection to computer 142 or adjunct devices 143; via WiFi, cellular, or other suitable connection to a network device of remote network environment 150). It will be appreciated that, here, direct connections to network devices of remote network environment 150 are connections that do not traverse local network 140, but which may traverse a number of other network elements. The captured content and object data may be provided directly from content capture device 110 to the other device(s) in any other suitable manner.

In one embodiment, for example, the captured content and object data may be provided from the content capture device 110 to the other device indirectly. In such embodiments, the indirect transfer of the captured content and object data from content capture device 110 to the other device may be provided using any suitable communications capabilities. In one embodiment, for example, where one or more of adjunct devices 143 is configured to perform the processing for associating the information structure with the object 122 in the captured content to form the tagged content, the captured content and object data may be uploaded from content capture device 110 to computer 142 such that computer 142 may provide the captured content and object data to adjunct devices 143, via local network 141, and adjunct devices 143 may perform the association processing. In one embodiment, for example, where a network device of remote network environment 150 is configured to perform the processing for associating the information structure with the object 122 in the captured content to form the tagged content, the captured content and object data may be uploaded from content capture device 110 to computer 142 (via wired and/or wireless communication) such that computer 142 may provide the captured content and object data to the network device of remote network environment 150, via service provider network 141 and Internet 142, and the network device of remote network environment 150 may perform the association processing. The captured content and object data may be provided indirectly from content capture device 110 to the other device in any other suitable manner.

The captured content and object data may be provided from content capture device 110 to the other device(s) at any suitable time.

In one embodiment, for example, in which content capture device 110 is unable to communicate with local network environment 140 or remote network environment 150 wirelessly, transmission of the captured content and object data from the content capture device 110 toward the other device may be initiated by the content capture device 110 (1) when the content capture device 110 is connected to the other device or an intermediate device, or (2) at any suitable time after which the content capture device 110 is connected to the other device or intermediate device. In embodiments in which the content capture device is connected to the other device (e.g., to computer 142 or adjunct devices 143), the captured content and object data may be provided from content capture device 110 to the other device upon connection of the content capture device 110 to the other device and/or in response to instructions from the user that the captured content and object data should be transferred to the other device. In embodiments in which the content capture device 110 is connected to an intermediate device that is capable of receiving the captured content and object data and providing the captured content and object data to the other device, the captured content and object data may be provided from content capture device 110 to the intermediate device upon connection of the content capture device 110 to the intermediate device and/or in response to instructions from the user that the captured content and object data should be transferred to the intermediate device. In embodiments in which the content capture device 110 is connected to an intermediate device that is capable of receiving the captured content and object data and providing the captured content and object data to the other device, the intermediate device may provide the captured content and object data to the other device upon receiving the captured content and object data from content capture device 110, securely store the captured content and object data at the intermediate device for later transmission to the other device (e.g., automatically based on a schedule, in response to instructions from a user via the intermediate device or another device, and the like), and the like, as well as various combinations thereof.

In one embodiment, for example, in which content capture device 110 is able to communicate with local network environment 140 and/or remote network environment 150 wirelessly, transmission of the captured content and object data from the content capture device 110 toward the other device (e.g., to the other device or to an intermediate device configured for providing the captured content and object data to the other device) may be initiated by the content capture device 110 at any suitable time. For example, transmission of the captured content and object data may be initiated by the content capture device 110 (1) at the time at which the content capture is performed (e.g., when the picture is taken, as the video is taken, and the like) and/or (2) at a time after the time at which the content capture is performed, but prior to/without the content capture device 110 having to be physically connected to the other device or an intermediate device in order to upload the captured content and object data to the other device. In such embodiments, the content capture device 110 may communicate with the other device directly (e.g., via a direct connection between content capture device 110 and computer 142 where computer 142 is the device that will perform the association processing, via a direct connection between content capture device 110 and a network device of remote network environment 150 where the network device is the device that will perform the association processing, and the like). In such embodiments, the content capture device 110 may communicate with the other device indirectly via an intermediate device configured for providing the captured content and object data to the other device. In such embodiments, transmission of the captured content and object data to the other device, or to an intermediate device for transmission to the other device, may be performed automatically and/or manually. For example, transmission of the captured content and object data to the other device or to the intermediate device may be performed as each item of content is captured (e.g., as each picture is taken), after a threshold number of content items are captured (e.g., after every ten pictures are taken, after three videos are taken, and the like), periodically (e.g., once per hour, once per day, and the like, where the time period may be automatically and/or manually configured), and the like, as well as various combinations thereof. In such embodiments, the captured content and object data may be provided to any suitable device(s) of the local network environment 140 and/or remote network environment 150.

In this embodiment, the information structure may be obtained from any suitable source. In one embodiment, for example, the information structure may be received, by the device(s) performing the automatic association of the information structure to the object 122, from the content capture device 110. In one embodiment, for example, the information structure may be stored on the device(s) performing the automatic association of the information structure to the object 122. In one embodiment, for example, the information structure may be received, by the device(s) performing the automatic association of the information structure to the object 122, from one or more other devices (e.g., computer 142, adjunct devices 143, a network device of remote network environment 150, and the like, as well as various combinations thereof).

In such embodiments, the process of automatically associating an information structure to an object 122 in captured content may be initiated by the other device(s) in response to any suitable trigger condition. For example, automatic association of an information structure to an object 122 in captured content may be initiated by the other device automatically upon receiving the captured content and object data, automatically based on the level of activity on the other device 110 (e.g., at times are which the other is not currently being used), automatically based on a schedule and/or threshold condition(s) (e.g., periodically after a certain amount of time has passed, after a threshold number of images have been captured, and/or based on any other suitable scheduling and/or threshold condition(s)), in response to a request initiated manually by a user via a user interface of other device (e.g., upon receiving the captured content and object data, the receiving device is configured to store the captured content and object data until receiving an indication that the user has initiated the association/tagging process), and the like, as well as various combinations thereof.

As described herein, the automatic tagging of an object in captured content includes (1) associating of a content tag with the object within the captured content and (2) associating of an information structure to the object in the captured content, via an association of the information structure to the content tag associated with the object. In various embodiments of automatic content tagging depicted and described herein, these associations may be provided in any suitable manner.

The association between tagged content and a content tag of the tagged content may be provided in any suitable manner.

In one embodiment, for example, the tagged content and the content tag generated for association with the tagged content may be maintained as a single content structure (e.g., file, data stream, and the like). In one such embodiment, for example, where the content tag is embedded within the same file as the tagged content, the content tag may be embedded within the same file such that (1) it is directly associated with the object for which it is intended, e.g., via an overlay of the content tag over the object or any other suitable type of direct association (i.e., the association processing does not need to be performed at the time that the tagged content is accessed) or (2) it is not directly associated with the object for which it is intended but is readily available within the same file (i.e., the association processing for overlaying the content tag on the object for which it is intended, or otherwise associating the content tag with the object for which it is intended, is performed at the time that the tagged content is accessed).

In one embodiment, for example, the tagged content item and the content tag generated for association with the tagged content item may be maintained as separate content structures (e.g., separate files, separate data streams, and the like). In this embodiment, the tagged content may include a pointer to the content tag to be associated with the tagged content, such that, when the tagged content is accessed, the content tag may be retrieved and embedded within the tagged content for enabling selection of the content tag by the user(s) accessing the tagged content. In this embodiment, the pointer to the content tag may be represented within, or otherwise associated with, the tagged content in any suitable manner (e.g., via inclusion of an identifier of the content tag within the tagged content, inclusion of an address of the content tag within the tagged content, and the like, as well as various combinations thereof). This enables the content tag for tagged content to be managed independently from the tagged content itself, thereby enabling users to access the tagged content based on or independent of permissions, while retaining more stringent control over access to the content tag via which the information structure/object information is accessed.

The association between a content tag of tagged content and an information structure including object information of an object included within the tagged content may be provided in any suitable manner.

In one embodiment, for example, the content tag associated with an object included within tagged content includes the information structure storing the object information of the associated object. This may be the case where the content tag is embedded within the tagged content or provided as a separate content structure which is combined with the captured content to present the tagged content.

In one embodiment, for example, the content tag associated with an object included within tagged content includes a pointer to the information structure storing the object information of the associated object. In this embodiment, the information structure may be stored as a separate content structure (e.g., file, data stream, and the like) that is separate from the content tag, such that, when the tagged content is accessed, the information structure may be retrieved and presented to the user(s) selecting the content tag from the tagged content. In this embodiment, the pointer to the information structure may be represented within, or otherwise associated with, the content tag in any suitable manner (e.g., via inclusion of an identifier of the information structure within the content tag, inclusion of an address of the information structure within the content tag, and the like, as well as various combinations thereof). This enables the information structure for tagged content to be managed independently from the content tag (and, thus, the tagged content itself), thereby enabling users to access the tagged content based on or independent of permissions, while retaining more stringent control over access to the information structure/object information via the associated content tag.

With respect to the above-described embodiments of associations between the tagged content and the content tag and associations between the content tag and the information structure, it will be appreciated that various combinations of such embodiments may be used (e.g., in different implementations of content tagging system 100, in different tagged content items generated within content tagging system 100, for different objects/content tags/information structures associated with the same tagged content item, and the like, as well as various combinations thereof).

It will be appreciated that such associations may control the manner in which tagged content is presented to a user and/or the manner in which object information associated with an object included within tagged content is accessed.

Although primarily depicted and described herein with respect to embodiments in which automatic tagging of content includes associating of a content tag to an object within captured content and association of an information structure to the content tag where such steps are performed by a single device, it will be appreciated that in at least some embodiments such steps may be performed by multiple devices. In one embodiment, for example, a first device may perform processing for identifying a location of an object within captured content and associating a content tag with the object within the captured content, and a second device may perform processing for associating an information structure with the content tag. It will be appreciated that the various functions may be distributed across multiple devices in various other ways.

From the foregoing descriptions, it will be apparent that the various functions of the content tagging and management capability may be centralized on any suitable element of content tagging system 100 and/or distributed across any suitable combination(s) of elements of content tagging system 100.

As described herein, the automatic tagging of an object in captured content results in the creation of tagged content, which may then be handled in any suitable manner for handling such content.

For example, tagged content may be stored, transmitted, presented, and the like, as well as various combinations thereof. It will be appreciated that tagged content may be stored, transmitted, presented, and the like by any suitable device(s), such as a content capture device which creates the tagged content, a user device which creates the tagged content, a network device on which tagged content is stored until accessed, user devices on which tagged content is accessed, and the like, as well as various combinations thereof.

For example, tagged content may be accessed in any suitable manner (e.g., when received via e-mail, from websites, and the like, as well as various combinations thereof). It will be appreciated that tagged content (e.g., pictures, videos, multimedia, and the like) may be accessed using any suitable user device upon which tagged content may be presented and from which content tags in the tagged content may be selected for accessing information associated with the object(s) of the tagged content. For example, the user device may be a computer, tablet PC, smartphone, public safety specialized devices and Federal agency mandated FIPS compliant device, and the like.

As described herein, the manner in which tagged content is presented to a user may depend on the manner in which certain associations (e.g., the association between tagged content and a content tag of tagged content) are maintained and controlled.

In one embodiment, for example, in which the tagged content and the content tag generated for association with the tagged content are maintained as a single file, the file may be provided to the intended user device and then processed for presenting the tagged content including the content tag. For example, if the file is arranged such that the content tag is already associated with the object, the file is processed for presenting the tagged content. For example, if the file is arranged such that the content tag is not already associated with the object, the file is processed for extracting information associated with the content tag and presenting the tagged content with the content tag embedded in the proper location.

In one embodiment, for example, in which the tagged content item and the content tag generated for association with the tagged content item are maintained as separate files, both the tagged content file and the content tag file are provided to the intended user device and then processed in order to combine them to present the tagged content.

The two files may be provided to the user device contemporaneously. For example, where a user requests the tagged content from a website via the user device, the tagged content file and the associated content tag file may be retrieved and provided to the user device. For example, where a user receives the tagged content in an email from a friend, the email may include both the tagged content file and the content tag file.

The two files may be provided to the user device sequentially. For example, where a user requests the tagged content from a website via the user device, the tagged content file may be retrieved and provided to the user device, the user device may identify the content tag file from information included within the tagged content file (e.g., an address or identifier of the content tag), the user device may then request and receive the content tag file. For example, where a user receives the tagged content in an email from a friend, the email may include the tagged content file, the user device may identify the content tag file from information included within the tagged content file (e.g., an address or identifier of the content tag), the user device may then request and receive the content tag file (e.g., from a network element storing content tags for tagged content).

The tagged content file and content tag file, once received at the user device, may be processed in any suitable manner for presenting the tagged content. For example, the tagged content file may include a marker identifying the intended position of the content tag within the tagged content, such that the content tag may then be added to the tagged content when presented via the user device. Similarly, for example, the file including the content tag may include information adapted for use by the user device in locating the intended position of the content tag within the tagged content, such that the content tag may then be added to the tagged content when presented via the user device.

As described herein, the manner in which object information associated with an object included within tagged content is accessed may depend on the manner in which certain associations (e.g., the association between a content tag of tagged content and an information structure including object information of an object included within the tagged content) are maintained and controlled.

In one embodiment, for example, in which the content tag associated with an object included within tagged content includes the information structure storing the object information of the associated object, the object information is obtained from the information structure, upon selection of the content tag, and the object information is presented to the user via the user device. In this case, the content tag may be embedded within the tagged content or provided as a separate file which may be accessed for presenting the content tag and then presenting the object information in response to selection of the presented content tag.

In one embodiment, for example, in which the content tag associated with an object included within tagged content includes a pointer to the information structure storing the object information of the associated object, the information structure is retrieved in response to selection of the content tag, and the objection information of the information structure is presented to the user via the user device. In this case, the pointer to the information structure may be represented within, or otherwise associated with, the content tag in any suitable manner (e.g., via inclusion of an identifier of the information structure within the content tag, inclusion of an address of the information structure within the content tag, and the like, as well as various combinations thereof).

In such embodiments, it will be appreciated that access to the object information of the information structure may also require one or more criteria to be satisfied (e.g., the user requesting access has the proper permissions level, the user requesting access is online, and the like, as well as various combinations thereof). These potential criteria are omitted from the present discussion for purposes of clarity in describing management of the content tag and the associated information structure, including presentation of the object information at a user device in response to selection of the content tag.

As described herein, in at least one embodiment the content capture device 110 is configured to perform association processing for automatically associating an information structure to an object in captured content. An exemplary content capture device according to one such embodiment is depicted and described with respect to FIG. 2.

FIG. 2 depicts a high-level block diagram of one embodiment of the content capture device of FIG. 1.

As depicted in FIG. 2, content capture device 110 includes a content capture module 210, a memory 220, a content tagging module 230, and a controller 240.

The content capture module 210 includes one or more content capture mechanisms $211_1$-$211_N$ (collectively, content capture mechanisms 211), where each content capture mechanism 211 is configured for capturing content and providing the captured content to memory 220 for storage in memory 220.

The content capture mechanisms 210 may include any suitable mechanism(s) for capturing content. For example, the content capture mechanisms 211 may include one or more of an audio content capture mechanism, an image content capture mechanism, a video content capture mechanism, and the like, as well as various combinations thereof.

The manner in which such content types may be captured by such content capture mechanisms will be understood by one skilled in the art. For example, the manner in which a camera typically captures image content will be understood by one skilled in the art. Similarly, for example, the manner in which a video recorder typically captures video and audio content will be understood by one skilled in the art.

It will be appreciated that the type(s) of content capture mechanism(s) 211 included within content capture device 110 may depend on the type of content capture device 110, the type of content intended to be captured (e.g., photos, videos, and the like) by the content capture device 110, and/or any other suitable factors.

In one embodiment, for example, the content capture device 110 is a camera including an image content capture mechanism. It will be appreciated that many cameras also now include audio/video recording capabilities.

In one embodiment, for example, the content capture device 110 is a video recorder including video and audio content capture mechanisms. It will be appreciated that many video recorders also now include image content capture capabilities (e.g., for taking still photographs as well).

The content capture device 110 may include any other suitable type of device, which may include any suitable combination of such content capture mechanisms 111.

In one embodiment, one or more of the content capture mechanisms 211 captures content to be automatically tagged as described herein. For example, an audio content capture mechanism may capture audio content that is to be tagged. For example, an image content capture mechanism may capture image content that is to be tagged. For example, audio and video content capture mechanism may capture audio and video content that is to be tagged.

In one embodiment, in addition to using one or more content capture mechanisms 211 for capturing content to be tagged, one or more of the content capture mechanisms 211 may be used to capture content objects within the captured content (which also may be referred to herein as content-within-content). As described herein, this may include content-within-content such as tagging of a television program displayed on a television when the television is captured in a picture, tagging of a song playing when video is captured, and the like.

In one such embodiment, multiple content capture mechanisms 211 may cooperate to enable capturing of such content objects within captured content (which also may be referred to herein as content-within-content).

In one embodiment, for example, where a user initiates capture of image content (e.g., a picture) using an image content capture mechanism, an audio content capture mechanism of content capture device 110 also may be activated such that the content capture device 110 also captures audio content associated with the captured image for tagging the audio content (which, in this context, is considered a content object) within the captured image content.

In this embodiment, the audio content may be captured and identified in any suitable manner. In one embodiment, for example, the audio content capture mechanism records some audio contemporaneous with capture of the image content. The captured audio content is then processed in order to identify the audio content (e.g., title, artist, and other associated information). The captured audio content may be identified from information embedded within the captured audio, by comparing the captured portion of the audio to a database of audio recordings in order to identify a match, and the like.

In this embodiment, the audio content object may be tagged within the captured image in any suitable manner. For example, where the audio is audio of a television program playing on a television captured within the captured image, the content tag that is associated with the captured image for the audio content may be associated with the television within the tagged image. For example, where the audio is audio of a radio playing in an adjacent room but not captured within the captured image, the content tag that is associated with the captured image for the audio content may be placed in any suitable location within the captured image.

The capture, identification, and tagging of audio content objects in conjunction with content capture (e.g., still image content, such as pictures) may be performed in any other suitable manner.

In one embodiment, for example, where a user initiates capture of a picture using an image content capture mechanism, a video content capture mechanism of content capture device 110 also may be activated such that the content capture device 110 also captures video content associated with the captured image for tagging the video content (which, in this context, is considered a content object) within the captured image content.

In this embodiment, the video content may be captured and identified in any suitable manner. In one embodiment, for example, the video content capture mechanism records one or more video frames of the video contemporaneous with capture of the image content. The captured video content is then processed in order to identify the video content (e.g., name of the show or movie, and other associated information). The captured video content may be identified from information embedded within the captured video, by searching a database of video recording information using at least a portion of one or more of the video frames of the captured video, and the like.

In this embodiment, the video content object may be tagged within the captured image in any suitable manner. For example, where the video is video of a television program playing on a television captured within the captured image, the content tag that is associated with the captured image for the video content may be associated with the television within the tagged image.

The capture, identification, and tagging of video content objects in conjunction with content capture (e.g., still image content, such as pictures) may be performed in any other suitable manner.

As depicted in FIG. 2, the content capture mechanism or mechanisms 211 are actuated by a content capture control 212, such as a button on a camera, a button on a video recorder, a touch screen control on a smartphone, or any other suitable mechanism for actuating one or more of the content capture mechanisms 211 to capture content (e.g., captured content to be tagged and/or content objects associated with captured content to be tagged) for storage in memory 220.

The memory 220 provides storage for storing content captured by content capture mechanisms 211 and, optionally, for storing information for content tagging module 230 (e.g., captured content to be tagged by content tagging module 230, content objects to be tagged within captured content by content tagging module 230, information structures to be associated with captured content via automatic tagging of the captured content, tagged content generated by content tagging module 230, and the like, as well as various combinations thereof). The memory 220 may be any suitable form of memory. For example, memory 220 may include an internal memory, a memory inserted into the content capture device 110 (e.g., a memory stick inserted into a camera, a SIM card in a camera phone, and the like), an external memory, and the like. It will be appreciated that content capture device 110 may have multiple such types of memory available.

The content tagging module 230 is configured to perform automatic tagging of content captured by content capture mechanisms 211.

As depicted in FIG. 2, content tagging module 230 includes a plurality of transceivers 231₁-231_N (collectively, transceivers 231), a transceiver input/output (I/O) interface 232, an encryption/decryption (E/D) module 233, and a content tagging logic module 234.

As depicted in FIG. 2, in one embodiment the content tagging module 230 also may be actuated by the content capture control 212 which is used to actuate content capture mechanisms 211 to capture content for storage in memory 220. The actuation of the content tagging module 230 triggers the content tagging module 230 to perform functions for receiving object data from sensors 124 which may then be used for automatically tagging content captured by content capture mechanisms 211 upon actuation of content capture control 212 (e.g., prepare to receive information from sensors 124, initiate communications with sensors 124 to receive information from sensors 124, and the like). The actuation of the content tagging module 230 also may trigger the content tagging module 230 to perform various other functions (e.g., performing automatic content tagging processing for automatically tagging the content captured by content capture mechanisms 211, transmitting the captured content and object data toward one or more other devices such that the other device(s) may perform automatic content tagging processing for automatically tagging the content captured by content capture mechanisms 211, and the like). Although primarily depicted and described with respect to embodiments in which the content tagging module 230 is actuated using the same control mechanism that is used to actuate content capture mechanisms 211, in other embodiments the content capture device 110 may include a different control configured for actuating content capture module 230. In one such embodiment, for example, a separate content capture control (e.g., another button on a camera, another button on video recorder, or any other suitable control mechanism) may be provided on the content capture device 110, thereby enabling the user to control whether or not automatic content tagging is to be performed for the content captured by content capture mechanisms 211.

The transceivers 231 provide communications capabilities for content capture device 110. The transceivers 231 include one or more wireless transceivers (illustratively, the transceivers 231₁ and 231₂) and one or more wired transceivers (illustratively, transceiver 231_N).

Although depicted and described with respect to specific numbers and types of transceivers being included within content capture device 110, it will be appreciated that any suitable numbers and/or types of transceivers 231 may be included within content capture device 110.

Although primarily depicted and described herein with respect to use of transceivers (within content capture device 110, it will be appreciated that content capture device 110 may include any suitable numbers and/or types of transmitters, receivers, transceivers, and the like, as well as various combinations thereof.

The transceivers 231 may support communication with various elements of content tagging system 100.

For example, one or more of the transceivers 231 may support communications with sensors 124 for receiving object data from sensors 124, which may depend on the types of sensors 124 and/or on the types of communications supported by those sensors 124 (e.g., cellular communications, Bluetooth communications, RFID communications, Bokode/Barcode/QR Code communications, licensed/unlicensed spectrum based communication, and the like, as well as various combinations thereof).

For example, one or more of the transceivers 231 may support communications with one or more devices of local network environment 140 and/or one or more devices of remote network environment 150. For example, one or more of the transceivers 231 may communicate with local network environment 140 and/or network environment for providing automatically tagged content, generated by content capture device 110, to local network environment 140 and/or remote network environment 150. For example, one or more of the transceivers 231 may communicate with local network environment 140 and/or network environment for requesting information which may be needed by content capture device 110 to perform automatic tagging of content captured by content capture device 110 (e.g., for requesting object data, one or more information structures, and the like, as well as various combinations thereof). For example, one or more of the transceivers 231 may communicate with local network environment 140 and/or remote network environment 150 for providing captured content and associated object data to one or more devices of local network environment 140 and/or remote network environment 150, such that the captured content may be automatically tagged by the one or more devices of local network environment 140 and/or remote network environment 150. For example, one or more of the transceivers 231 may communicate with local network environment 140 and/or remote network environment 150 for providing captured content, object data, and one or more information structures to one or more devices of local network environment 140 and/or remote network environment 150, such that the captured content may be automatically tagged by the one or more devices of local network environment 140 and/or remote network environment 150. It will be appreciated that in such embodiments, the transceivers 231 may support any suitable communications capabilities (e.g., wireline communications, cellular communications, WiFi communications, and the like, as well as various combinations thereof).

The transceiver I/O interface 232 provides an interface between transceivers 231 and E/D module 233. The transceiver I/O interface 232 may be implemented in any manner suitable for supporting communications between multiple transceivers 231 and the E/D module 233 (e.g., using any suitable number of communication paths from transceiver I/O interface 232 to transceivers 231 and, similarly, using any suitable number of communication paths to the E/D module 233).

The E/D module 233 provides encryption and decryption capabilities for content tagging logic module 234. The E/D module 233 decrypts encrypted information intended for content tagging logic module 234 (e.g., captured content received from content capture mechanisms 211 and/or memory 220, object data received from sensors 124 via transceivers 231 and transceiver I/O interface 232, information structures received via transceivers 231 and transceiver I/O interface 232 (e.g., from local network environment 140 and/or remote network environment 150), and the like, as well as various combinations thereof. The E/D module 233 encrypts information transmitted by content tagging logic module 234. For example, E/D module 233 encrypts one or more of captured content, object data, information structures, tagged content, and the like, being transmitted to local network environment 140 and/or network environment. For example, E/D module 233 encrypts tagged content being provided to memory 220 for storage in memory 220. The E/D module 233 may encrypt/decrypt any other suitable information.

The content tagging logic module 234 is configured to perform automatic tagging of content captured by content capture mechanisms 211.

As depicted in FIG. 2, content tagging logic module 234 includes a memory 235, content analysis logic 236, and overlay creation logic 237.

The memory 235 provides storage for securely storing information for use by content analysis logic 236 and overlay creation logic 237, and for securely storing information that is generated by content analysis logic 236 and overlay creation logic 237. For example, as depicted in FIG. 2, memory 235 may securely store information such as captured content, content tags to be associated with objects within captured content, information structures to be associated with captured content via automatic tagging of captured content, tagged content, and the like, as well as various combinations thereof. It will be appreciated that use of the memory 235 within content tagging logic module 234 may obviate the need for encryption and decryption processing when content analysis logic 236 and overlay creation logic 237 access such information for processing, while at the same time still enabling secure storage of the information. The memory 235 may be any suitable form of memory, as will be understood by one skilled in the art.

The content analysis logic 236 is configured for analyzing captured content for determining, for each object 122 included within captured content, information for use in tagging the object 122 within the captured content.

The information for use in tagging the object 122 within captured content may include any information suitable for use in determining a position within the captured content where the associated content tag for the object 122 should be embedded. For example, information for use in tagging the object 122 within captured content may include a position of the object 122 within the captured content and, optionally, may include the dimensions of the object 122 within the captured content. The information for use in tagging the object 122 within captured content may be represented in any suitable format (e.g., as a coordinate position for a still image, as a combination of a frame number and a coordinate position within the frame for moving images, and the like).

The information for use in tagging the object 122 within the captured content may be determined in any suitable manner. In one embodiment, for example, information for use in tagging the object 122 within the captured content may be determined by processing one or more of the captured content in which the object 122 is included, information received from one or more sensors 124 associated with the object 122, and the like, as well as various combinations thereof.

The content analysis logic 236 provides the information for use in tagging the object 122 within the captured content to the overlay creation logic 237, for use by the overlay creation logic 237 to automatically tagging the captured content with a content tag associated with the object 122.

As depicted in FIG. 2, content analysis logic 236 is coupled to E/D module 233, memory 235, and overlay creation logic 237. The content analysis logic 236 is coupled to E/D module 233 for receiving captured content from the content capture mechanisms 211 and/or memory 220, for receiving object data of the object 122 from the sensor 124 associated with the object 122 (e.g., via transceivers 231, transceiver I/O interface 232, and E/D module 233), and the like. The content analysis logic 236 is coupled to memory 235 for accessing any information which may be used for tagging the object 122 within the captured content (e.g., captured content, position data indicative of the position of the object 122 within captured content, and the like). The content analysis logic 236 receives the captured content including the object 122 (e.g., from content capture mechanisms 211, memory 220, and/or memory 235) and receives the object data of the object 122 from the sensor 124 (e.g., via transceivers 231, transceiver I/O interface 232, and E/D module 233), and processes the received information for determining information for use in identifying the location of the object 122 within the captured content and for use in tagging the object 122 within the captured content. The content analysis logic 236 is coupled to overlay creation logic 237 for providing the information for use in tagging the object 122 within the captured content to the overlay creation logic 237.

The overlay creation logic 237 is configured for automatically tagging captured content. The overlay creation logic 237 automatically tags captured content, for a given object 122 included within the captured content, by (1) associating a content tag with the object 122 within the captured content and (2) automatically associating an information structure with the object 122 in the captured content, via an association of the information structure to the content tag associated with the object 122.

The overlay creation logic 237 has access to information for use in tagging the object 122 within the captured content (e.g., information indicative of a position of the object 122 within the captured content, information indicative of one or more dimensions of the object 122, and the like, as well as various combinations thereof). For example, the overlay creation logic 237 may receive the information from the content analysis logic 236, may securely retrieve the information from memory 235 (e.g., where content analysis logic 236 stores the information in memory 235), and the like.

The overlay creation logic 237 has access to the captured content and to an information structure to be associated with the object 122 in the captured content.

In one embodiment, for example, the overlay creation logic 237 may receive the captured content from content capture mechanisms 211, memory 220 or memory 235, and the like.

In one embodiment, for example, the overlay creation logic 237 may obtain the information structure from a local source (e.g., from one or more of memory 220, memory 235, and the like), from a remote source (e.g., from one or more devices of local network environment 140 and/or remote network environment 150), and the like. The information structure may be obtained from the remote source prior to content capture or during the processing for automatically tagging captured content.

In one embodiment, in which only a single information structure is available, the overlay creation logic 237 obtains the available information structure. For example, where the information structure provides a template suitable for use in storing object information for any type of object (or at least any type of object for which automatic content tagging will or is expected to be performed), the overlay creation logic 237 simply obtains the information structure (i.e., without requiring additional processing in order to identify an appropriate information structure from a plurality of available information structures).

In one embodiment, in which multiple information structures are available for use by overlay creation logic 237, overlay creation logic 237 selects one of the available information structures. The information structure may be selected in any suitable manner, as described herein. It will be appreciated that, since the multiple information structures available for selection may include various combinations of information structure types (e.g., templates to be populated with object information, structures that are already configured with at least some object information, and the like), various combinations of such embodiments may be used.

The overlay creation logic 237, using the captured content, the information for use in tagging the object 122 within the captured content, and the information structure, associates the information structure with the object 122 by associating a content tag with the object 122 within the captured and associating the information structure with the content tag, to form thereby tagged content.

The overlay creation logic 237 may associate the content tag with the object 122 within the captured content in any suitable manner. For example, overlay creation logic 237 may embed the content tag within the captured content. For example, overlay creation logic 237 may generate a content tag file and associate the content tag file with the captured content such that, when the tagged content is later retrieved for presentation to a user, the captured content and content tag file may be combined to present the tagged content. The overlay creation logic 237 may associate the content tag with the object 122 within the captured content before or after the information structure is associated with the content tag.

The overlay creation logic 237 may associate the information structure with the content tag in any suitable manner. For example, overlay creation logic 237 may embed the information structure within the captured content. For example, overlay creation logic 237 may generate an information structure file and associate the information structure file with the captured content (e.g., to the captured content directly, via the content tag with which the information structure is associated, and the like) such that, when the associated content tag is later selected by a user, the information structure file may be retrieved and the object data from the information structure may be presented to the user. The overlay creation logic 237 may associate the information structure with the content tag before or after the content tag is embedded within the captured content.

The overlay creation logic 237 associates an information structure with an object 122, e.g., via a content tag associated with captured content such that it is associated with the object 122, to form thereby tagged content. As described herein, the information structure that is associated with the object 122 to form the tagged content may store any suitable object information that is associated with the object 122, and the object information for the object 122 may be stored within the information structure in any suitable manner (e.g., at any time, in any suitable format, using any suitable population techniques, and the like).

The overlay creation logic 237, upon generating the tagged content, may then perform one or more actions using the tagged content.

The overlay creation logic 237 may trigger storage of the tagged content on content capture device 110 (e.g., in one or more of the memory 235, the memory 220, and/or in any other suitable memory).

The overlay creation logic 237 may trigger transmission of the tagged content from the content capture device 110. In one embodiment, for example, overlay creation logic 237 provides the tagged content to E/D module 233, the E/D module encrypts the tagged content and provides the encrypted tagged content to transceiver I/O interface 232, the transceiver I/O interface 232 provides the encrypted tagged content to one of the transceivers 231, and the transceiver 231 propagates the encrypted tagged content toward a remote device (e.g., toward local network environment 140 and/or toward remote network environment 150). In one embodiment, for example, overlay creation logic signals processor 240 for informing processor 240 that the tagged content is available, in response to which processor 240 may securely retrieve the tagged content from memory 235 or memory 220 and provide the tagged content to one of the transceivers 231 for transmission from content capture device 110. It will be appreciated that the tagged content may be transmitted from content capture device 110 in any other suitable manner.

The overlay creation logic 237 may trigger display of the tagged content via a display interface of content capture device 110.

The content capture device 110 is configured to perform any such actions (e.g., storage, transmission, display, and the like, as well as various combinations thereof) for tagged content at any suitable time and in any suitable manner.

Although primarily depicted and described herein with respect to use of overlay as the mechanism for associating a information structure with an object (e.g., via overlay of an associated content tag), association may, as described herein, be provided in any other suitable manner. In this case, the overlay creation logic 237 may be referred to more generally as association creation logic 237.

The processor 240 is coupled to content capture module 210, memory 220, and content tagging module 230. The processor 240 may be configured to control the various functions performed by content capture module 210 (including content capture performed by content capture mechanisms 211 of content capture module 210), memory 220, and content tagging module 230. The processor 240 also may be configured to perform various functions depicted and described herein with respect to other elements of content capture device 110.

Although omitted for purposes of clarity, it will be appreciated that the content capture device 110 may include and/or support various other modules and/or functions, which may depend on the type of device.

For example, where the content capture device 110 is a picture camera, it may include elements such as a viewfinder, a display interface, user control mechanisms for adjusting various camera settings (e.g., buttons, touch screen capabilities, and the like), a flash capability, video recording capabilities, and the like, as well as various combinations thereof. The typical elements, capabilities, and operation of a camera will be understood by one skilled in the art.

For example, where the content capture device 110 is a video camera, it may include elements such as a viewfinder, a display interface, user control mechanisms for adjusting various camera settings (e.g., buttons, touch screen capabilities, and the like), still photography capabilities, and the like, as well as various combinations thereof. The typical elements, capabilities, and operation of a video camera will be understood by one skilled in the art.

The typical capabilities and associated operation of other types of devices suitable for use with the content tagging and management capability will be understood by one skilled in the art.

Although primarily depicted and described herein with respect to embodiments in which content capture device 110 is a camera, as described herein the content capture device 110 may be any other suitable user device, which may result in a different configuration of the various elements and/or functions of content capture device 110 of FIG. 2.

Although primarily depicted and described herein with respect to embodiments in which the various elements of content capture device 110 are arranged in a particular manner, it will be appreciated that various elements of content capture device 110 of FIG. 2 may be arranged in any other manner suitable for providing the content tagging and management capability. For example, although depicted and described with respect to an embodiment in which various functions and capabilities are provided within content tagging module 230, it will be appreciated that the various functions and capabilities of content tagging module 230 may be implemented within content capture device 110 in any suitable manner (e.g., arranged in a different manner within content tagging module 230, distributed across multiple modules, and the like, as well as various combinations thereof). Similarly, for example, although depicted and described with respect to an embodiment in which various functions and capabilities are provided within content tagging logic module 234, it will be appreciated that the various functions and capabilities of content tagging logic module 234 may be implemented within content capture device 110 in any suitable manner (e.g., arranged in a different manner within content tagging logic module 234, distributed across multiple modules, and the like, as well as various combinations thereof).

Although primarily depicted and described herein with respect to embodiments in which association processing, for automatically associating an information structure to an object in captured content, is performed by content capture device 110, in other embodiments at least a portion of the association processing may be performed by one or more other devices. In such embodiments, at least a portion of the functional elements and/or associated functions depicted and described with respect to the exemplary content capture device 200 of FIG. 2 may be implemented on one or more other devices on which such functions are intended to be performed (e.g., on one or more of the computer 142, one or more adjunct devices 143, one or more network devices of remote network environment 150, and the like, as well as various combinations thereof). In such embodiments, it will be appreciated that the various functions of the functional elements may be distributed on or across one or more other devices in any other suitable manner.

Figure 3:
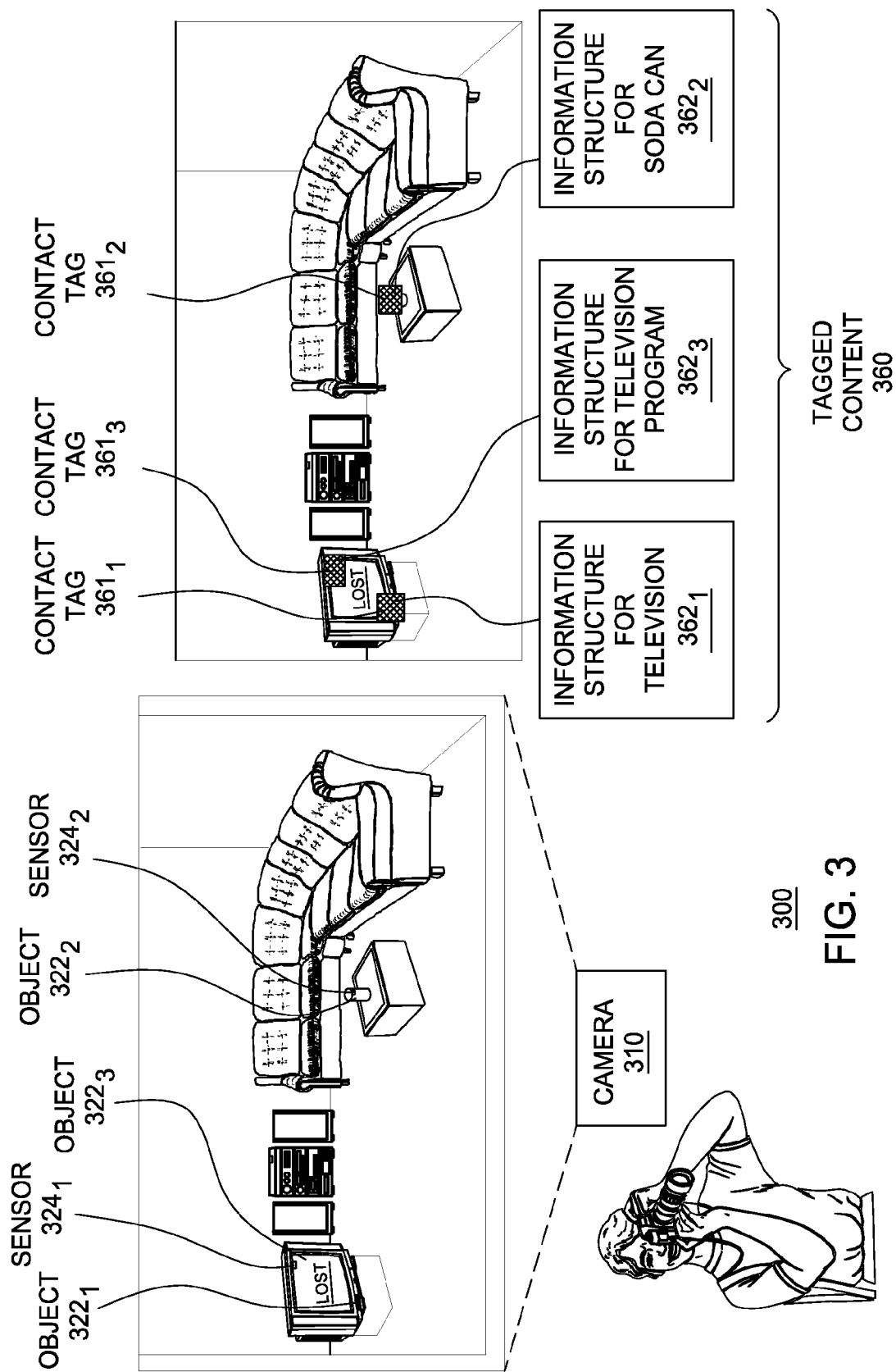
FIG. 3 depicts an exemplary embodiment of a process for creating tagged content.

FIG. 3 depicts an exemplary embodiment of a process for creating tagged content.

As depicted in FIG. 3, the process 300 illustrates capture of content including objects having sensors associated therewith, and automatic tagging of the captured content with content tags in order to associate information structures with the objects depicted in the captured content.

As depicted in FIG. 3, a person uses a camera 310 to take a picture of friends sitting in his living room. The field of vision of the camera 310 includes most of the living room, which includes various physical objects, including, among other things, a couch, a television and other electronics equipment, a coffee table, items on the coffee table, and various other objects. In FIG. 3, two of the physical objects within the field of vision of the camera 310 have respective sensors associated therewith. Namely, the television (denoted as object $322_1$) has a first sensor $324_1$ affixed thereto and a soda can (denoted as object $322_2$) on the coffee table has a second sensor $324_2$ embedded therein. The field of vision of the camera 310 also includes a content object $322_3$ (namely, the movie currently playing on the television). The objects $322_1$-$322_3$ may be referred to collectively as objects 322 and, similarly, the sensors $324_1$-$324_2$ may be referred to collectively as sensors 324.

The camera 310, when the picture is taken, generates an image denoted as captured content and performs processing for converting the captured content into tagged content 360. The captured content and, thus, tagged content 360, includes the various objects in the field of view of camera 310, including the television and the soda can.

The camera 310, when the picture is taken, detects the sensors 324 associated with the television and the soda can. The camera 310 receives object data from the sensors 324. The camera 310 determines the locations of the objects 322 within the captured content. The camera 310, using the locations of the objects 322 within captured content, associates content tags $361_1$ and $361_2$ with objects $322_1$ and $322_2$ within the captured content, respectively. The camera 310, using the object data from sensors 324, associates a pair of information structures $362_1$ and $362_2$ with content tags $361_1$ and $361_2$, respectively. The information structures $362_1$ and $362_2$ associated with content tags $361_1$ and $361_2$ securely store information about the model of television and the brand of soda, respectively, thereby enabling those who later view the picture to access the information of the information structures $362_1$ and $362_2$ via the associated content tags $361_1$ and $361_2$.

The camera 310, when the picture is taken, also performs content capture for capturing information about the television program playing on the television when the picture is taken. For example, the camera 310 may use a video capture mechanism for capturing one or more video frames of the television program, which may then be used for identifying the television program playing on the television when the picture is taken. In this sense, the television program is a content object (denoted as object $322_3$). The camera 310 determines the location of the content object $322_3$ within the captured content. The camera 310, using the location of the content object $322_3$ within captured content, associates a content tag $361_3$ with content object $322_3$ within the captured content. The camera 310, using object data associated with the content object $322_3$ (e.g., the captured video itself, information that is associated with the television program, and the like, as well as various combinations thereof), associates an information structure $362_3$ with content tag $361_3$, respectively. The information structure $362_3$ associated with content tag $361_3$ securely stores information about the television program, thereby enabling those who later view the picture to access the information of the information structure $362_3$ via the associated content tag $361_3$.

The result is tagged content 360 which, as described above, has the content tags 361 embedded therein and has information structures 362 association with the content tags 362. As described herein, tagged content 360 may be further handled by the camera 310 in any suitable manner (e.g., stored, transmitted, displayed, and the like).

Figure 4:
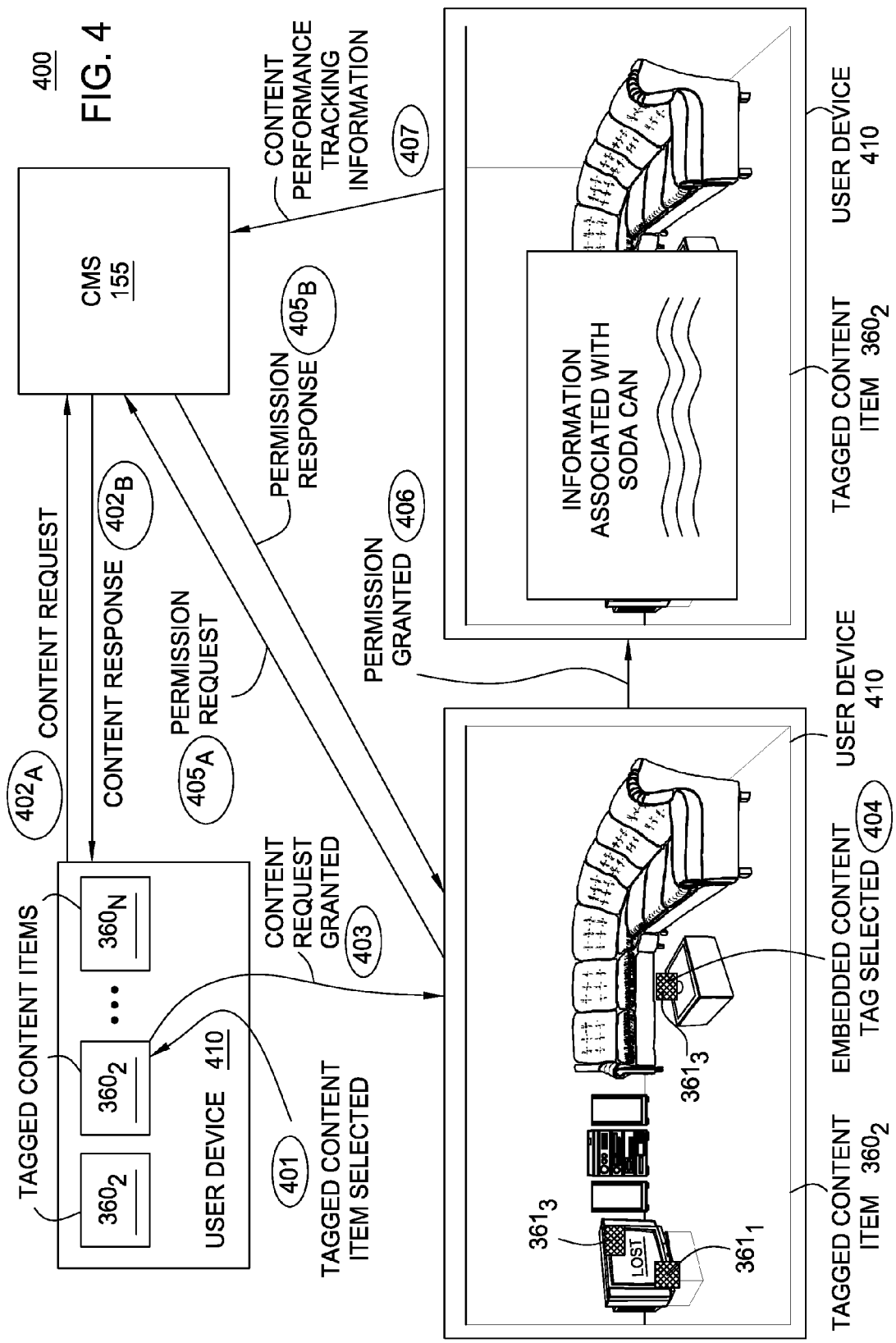
FIG. 4 depicts an exemplary embodiment of a process for accessing the tagged content of FIG. 3.

FIG. 4 depicts an exemplary embodiment of a process for accessing the tagged content of FIG. 3.

As depicted in FIG. 4, the process 400 illustrates accessing of tagged content by a user, where the tagged content is accessed by the user in response to a determination that the user is online and information from an information structure associated with the tagged content is accessed by the user in response to a determination that the user is permitted to access the information from the information structure. The process 400 consists of a number of steps (illustratively, numbered 1 through 7), including interaction between a user device 410 and CMS 155.

As depicted in FIG. 4, a user device 410 has a plurality of tagged content items $360_1$-$360_N$ (collectively, tagged content 360) displayed thereon (e.g., via a display interface of the user device 410). The tagged content items 360 are available for selection by the user via any suitable user control interface (e.g., keyboard, mouse, touch screen, and the like).

At step 401, tagged content item $360_2$ is selected by the user via the user control interface. The tagged content item $360_2$ is identical to tagged content 360 depicted and described with respect to FIG. 3. In one embodiment, in order to access tagged content, the user must be online.

At step 402, CMS 155 determines whether or not the user may access tagged content item $360_2$ by determining whether or not the user is permitted to access tagged content item $360_2$, e.g., whether or not the user has the proper permission level At step $402_A$, the user device 410 transmits a content request to CMS 155, requesting access to tagged content item $360_2$ in response to selection of tagged content item $360_2$ by the user.

The CMS 155 receives the content request from user device 410, and determines whether or not the user is permitted to access tagged content item $360_2$. In this example, assume that the user is permitted to access tagged content item $360_2$.

At step $402_B$, the CMS 155 transmits a content response to the user device 410, providing an indication as to whether user device 410 may display tagged content item $360_2$ for the user. In this example, since the user is permitted to access tagged content item $360_2$, the content response indicates that the user device 410 may display tagged content item $360_2$ for the user.

At step 403, the content request is granted and user device 410 displays tagged content item $360_2$ to the user. As depicted in FIGS. 3 and 4, and described with respect to FIG. 3, tagged content item $360_2$ includes three embedded content tags $361_1$, $361_2$, and $361_3$, which are associated with the television, soda can, and television program, respectively.

At step 404, embedded content tag $361_2$ of tagged content item $360_2$ is selected by the user via the user control interface. In one embodiment, in order to access information associated with an embedded content tag of a tagged content item, the user must have the proper permission level.

At step 405, CMS 155 determines whether or not the user may access the information associated with embedded content tag $361_2$ of tagged content item $360_2$ by determining whether or not the user is permitted to access that information, e.g., whether or not the user has the proper permission level.

At step $405_A$, the user device 410 transmits a permission request to CMS 155, requesting access to embedded content tag $361_2$ of tagged content item $360_2$ in response to selection of embedded content tag $361_2$ of tagged content item $360_2$ by the user.

The CMS 155 receives the permission request from user device 410, and determines whether or not the user has the proper permission level. In this example, assume that user device 410 is permitted to access all of the information of embedded content tag $361_2$ of tagged content item $360_2$.

At step $405_B$, the CMS 155 transmits a permission response to the user device 410, providing an indication as to whether user device 410 may display tagged content item $360_2$ for the user. In this example, the user is permitted to access all of the information of the embedded content tag $361_2$ of tagged content item $360_2$, the permission response indicates that the user device 410 may display the information associated with the embedded content tag $361_2$ of tagged content item $360_2$ for the user.

At step 406, the permission request is granted and user device 410 displays information associated with the embedded content tag $361_2$ of tagged content item $360_2$ to the user. As depicted in FIGS. 3 and 4, and described with respect to FIG. 3, the embedded content tag $361_2$ of tagged content item $360_2$ includes information associated with the soda can, which is displayed to the user. The information associated with the embedded content tag $361_2$ of tagged content item $360_2$ may be displayed to the user in any suitable manner (e.g., using the existing window, as an overlay, as a popup, using a new window, and the like, as well as various combinations thereof).

At step 407, content performance tracking information is transmitted from the user device 410 to CMS 155, for use by CMS 155 in tracking the performance of tagged content item $360_2$.

Figure 5:
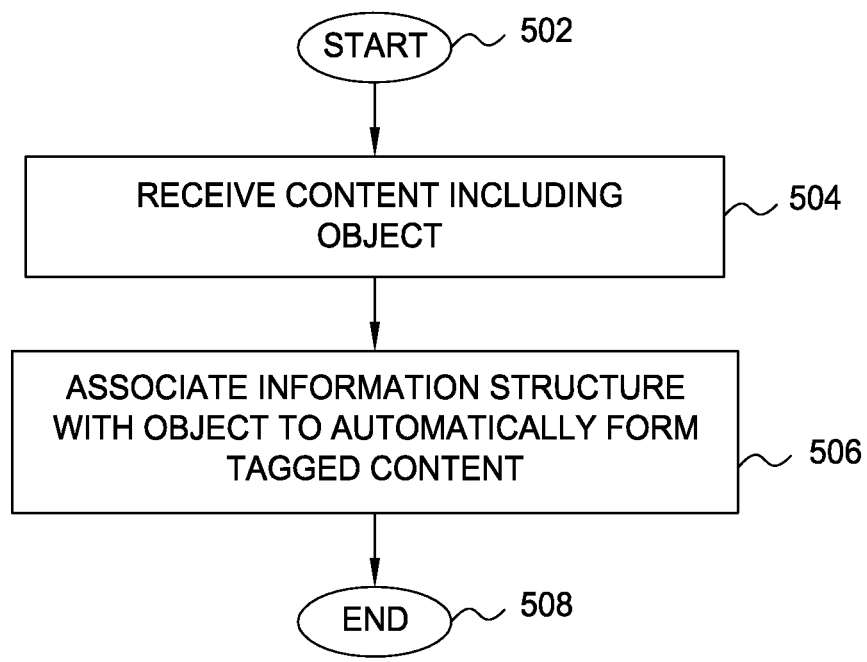
FIG. 5 depicts one embodiment of a method for automatically associating an information structure with an object included within captured content.

FIG. 5 depicts one embodiment of a method for automatically associating an information structure with an object included within captured content. The method 500 of FIG. 5 may be performed by any suitable device, e.g., the content capture device, a user device, a network device, and the like.

At step 502, method 500 begins.

At step 504, content is received, where the content includes an object. The content may include any content which may be captured, such as text, audio, video, and the like, as well as various combinations thereof. The content may be received during a content capture action at a content capture device, at a user device (e.g., of a home network) from a content capture device of other suitable device, at a network device from a content capture device, user device, or other suitable device, and the like.

At step 506, an information structure is automatically associated with the object included within the captured content to form tagged content.

At step 508, method 500 ends.

Figure 6:
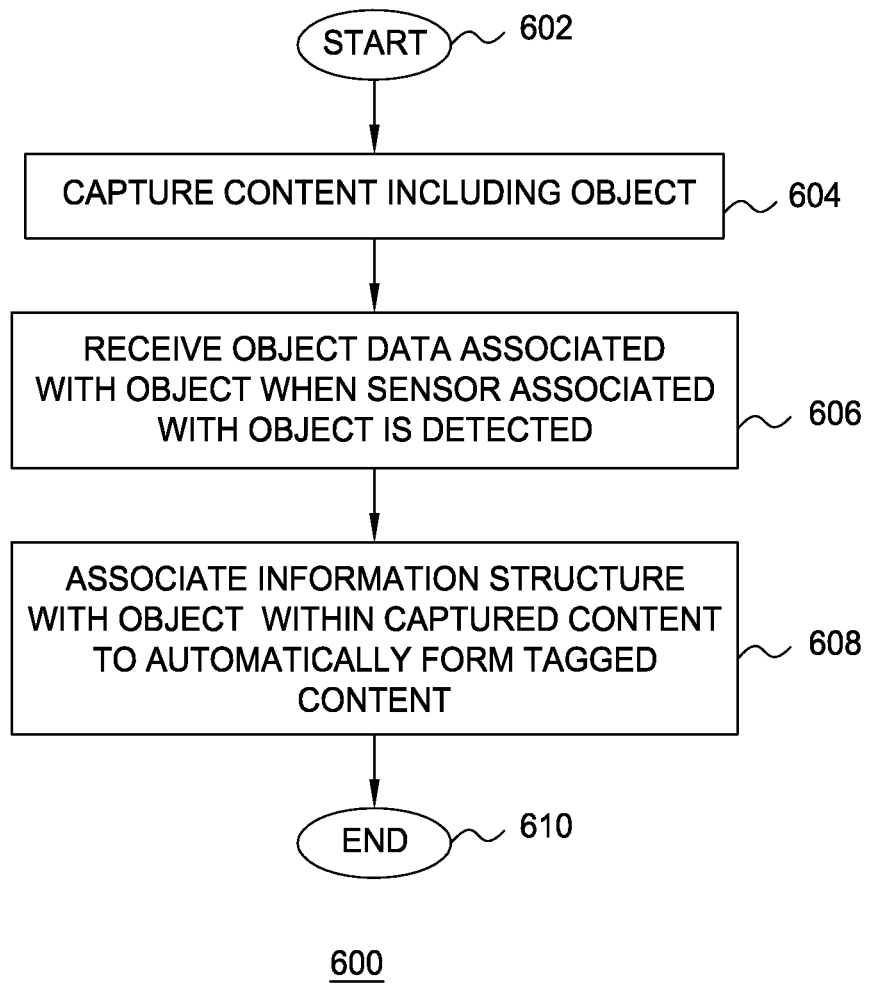
FIG. 6 depicts one embodiment of a method for automatically associating an information structure with an object included within captured content at a content capture device.

FIG. 6 depicts one embodiment of a method for automatically associating an information structure with an object included within captured content at a content capture device. The method 600 of FIG. 6 is performed by a content capture device.

At step 602, method 600 begins.

At step 604, content is captured, where the captured content includes an object. The content may include any content which may be captured, such as text, audio, video, and the like, as well as various combinations thereof. The content is captured during a content capture action at the content capture device.

At step 606, object data associated with the object is received when a sensor associated with the object is detected. The detection of the sensor enables the content capture device to obtain (locally and/or remotely) object data associated with the object (e.g., from the sensor, from the content capture device based on identification of the object and/or the sensor, from a network device based on identification of the object and/or the sensor and/or based on information received from the sensor, and the like, as well as various combinations thereof). The object data may be independent of an information structure or included within an information structure.

At step 608, an information structure is associated with the object included within the captured content to automatically form tagged content.

At step 610, method 600 ends.

Figure 7:
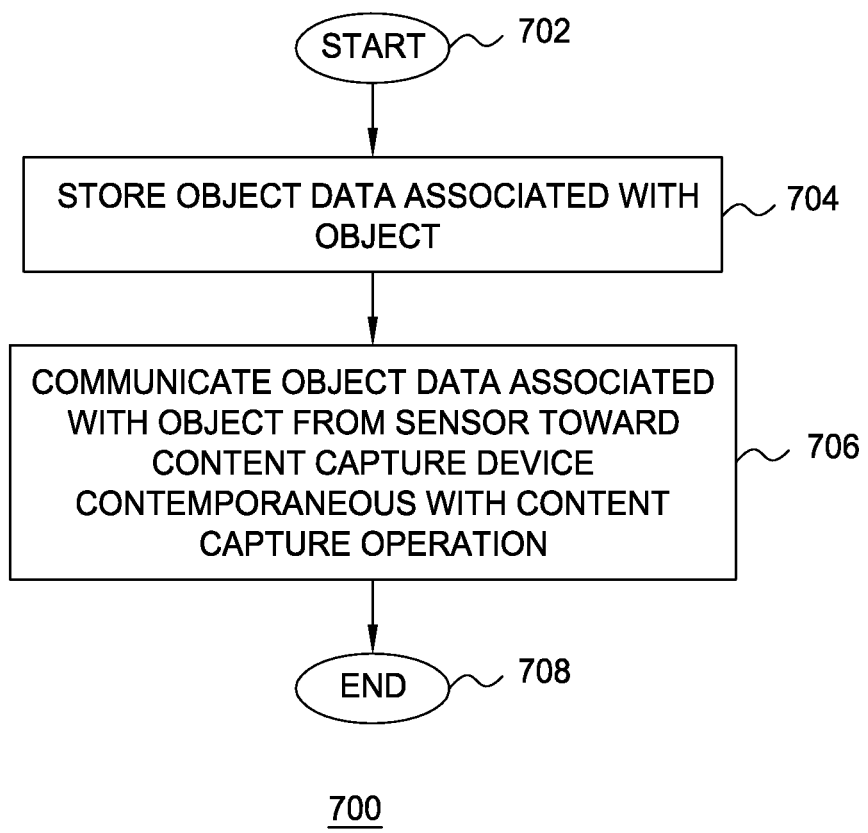
FIG. 7 depicts one embodiment of a method for use by a sensor during content capture by a content capture device.

FIG. 7 depicts one embodiment of a method for use by a sensor during content capture by a content capture device.

At step 702, method 700 begins.

At step 704, object data associated with an object is stored on the sensor. The object data may be received from a scanner for storage on the sensor. The object data may be stored by the sensor in any suitable format, which may depend on the type of sensor. The object data is stored securely such that it is accessible only to authorized users, which may include any suitable user(s) (e.g., publicly available to all users, available to a large group of users but not available publicly, available only to a small group of users, and the like). As described herein, the object data may include object information associated with the object, object data adapted for use in retrieving object information associated with the object, and the like, as well as various combinations thereof.

At step 706, object data is communicated from the sensor toward a content capture device contemporaneous with a content capture operation by the content capture device. It will be appreciated that the manner in which the object data is propagated may depend on the type of sensor. For example, in the case of a passive sensor, the communication of the object data may be by passive reading of the object data by the content capture device (e.g., by a content capture mechanism and/or communication interface). For example, in the case of an active sensor, the communication of the object data may be by active propagation of the object data to the content capture device (e.g., by a communication interface of the sensor).

At step 708, method 700 ends.

Figure 8:
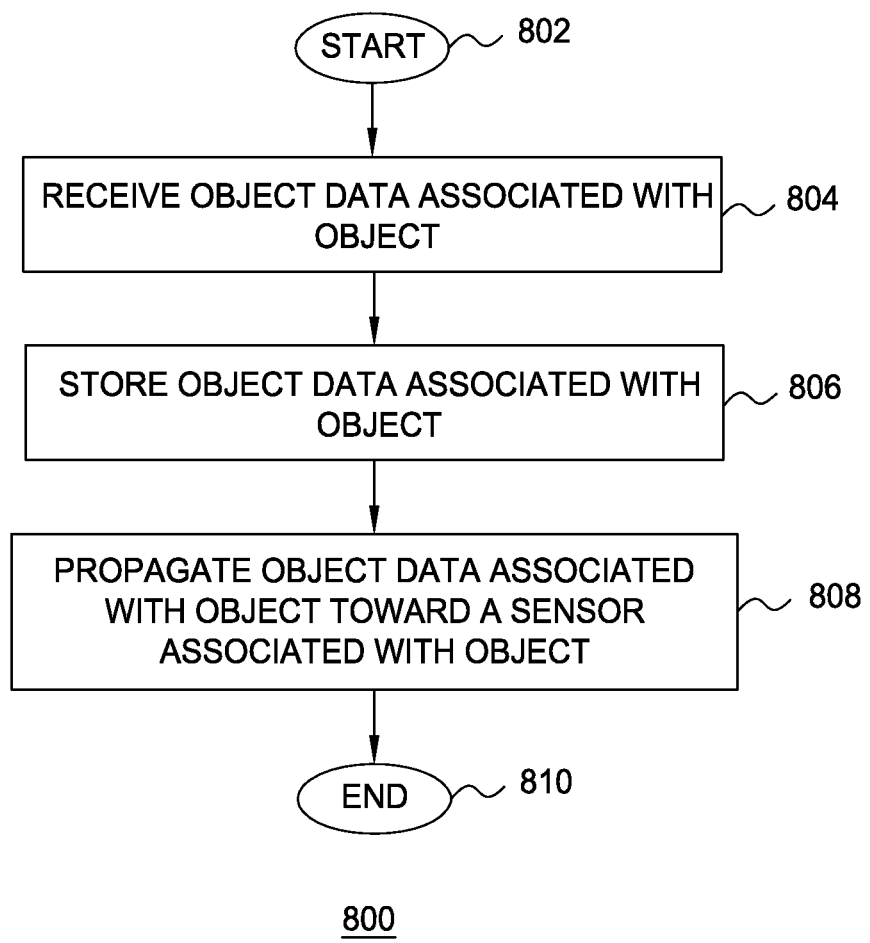
FIG. 8 depicts one embodiment of a method for by a sensor scanner for configuring a sensor for use during content capture by a content capture device.

FIG. 8 depicts one embodiment of a method for by a sensor scanner for configuring a sensor for use during content capture by a content capture device.

At step 802, method 800 begins.

At step 804, object data associated with an object is received at the sensor scanner (e.g., via a wired and/or wireless connection to the sensor scanner, from any suitable device(s)).

At step 806, the object data associated with the object is stored at the sensor scanner.

At step 808, the object data associated with the object is propagated from the sensor scanner toward a sensor associated with the object.

At step 810, method 800 ends.

Although primarily depicted and described with respect to an embodiment in which the object information is received, stored, and transmitted, it will be appreciated that other embodiments of method 800 may include subsets of these steps (e.g., receiving and storing object data, storing and propagating object data, and the like).

Figure 9:
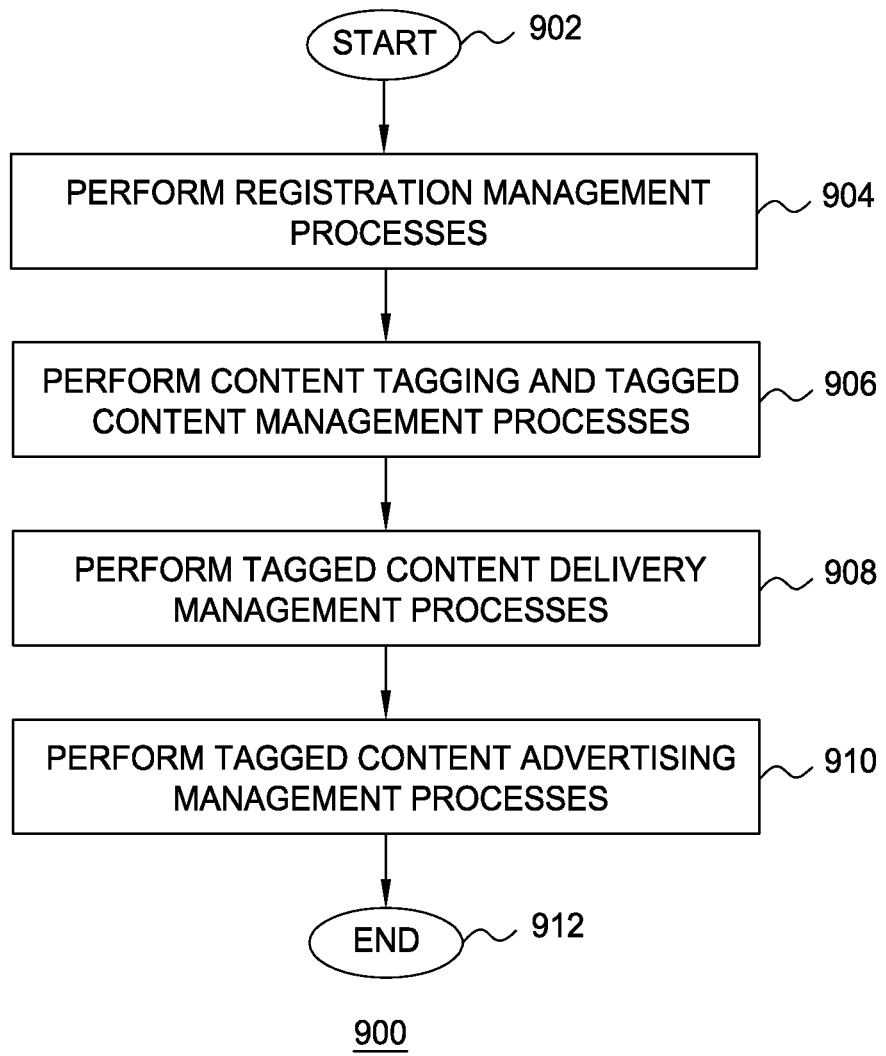
FIG. 9 depicts one embodiment of a method for enabling a content management system to provide various functions of the content tagging and management capability.

FIG. 9 depicts one embodiment of a method for enabling a content management system to provide various functions of the content tagging and management capability.

At step 902, method 900 begins.

At step 904, a registration process is performed, for enabling registration of various parties, entities, devices, and the like, which may participate in various aspects of the content tagging and management capability.

At step 906, a content tagging and tagged content management process is performed. This enables management of various features related to generation of tagged content and features related to handling of tagged content.

At step 908, a tagged content delivery management process is performed.

At step 910, a tagged content advertising management process is performed.

At step 912, method 900 ends.

It will be appreciated that each of the steps of method 900 may be implemented as its own method(s)/algorithm(s) having one or more associated steps for providing the indicated function(s). The steps of such methods/algorithms may be better understood by way of reference to the description of CMS 155, as well as various portions of FIGS. 10-13 depicted and described herein.

Figure 10:
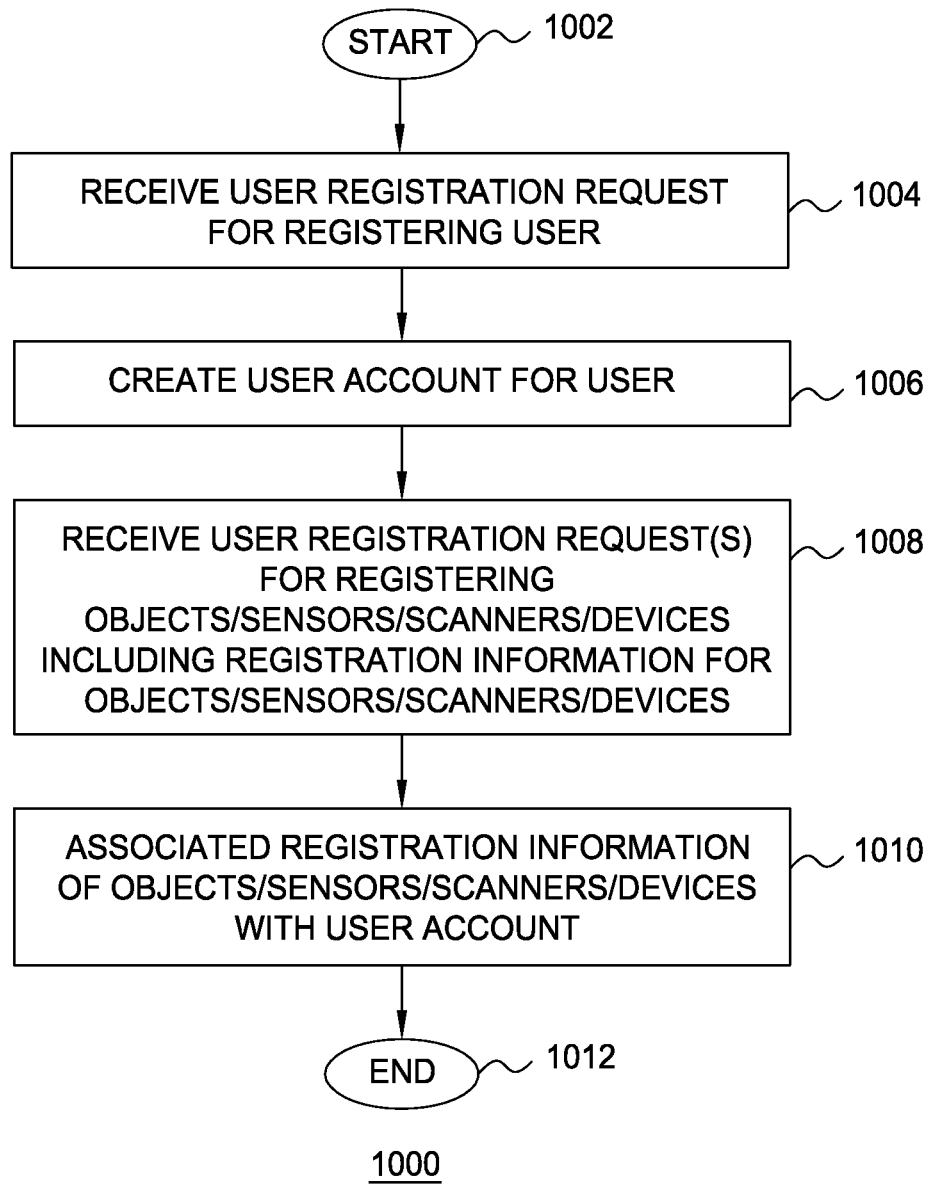
FIG. 10 depicts one embodiment of a method for enabling a content management system to register a user for enabling the user to generate tagged content.

FIG. 10 depicts one embodiment of a method for enabling a content management system to register a user for enabling the user to generated tagged content.

At step 1002, method 1000 begins.

At step 1004, the content management system receives a user registration request for registering the user with the content management system. The user registration request may include any suitable user registration information (e.g., name, address, login/password, and the like).

At step 1006, the content management system creates a user account for the user in response to the user registration request. The content management system associates the user registration information with the user account. The user account may be used for enabling various management functions to be performed by and/or on behalf of the user. For example, the user may access and manage permissions for sensors where the user controls sensors and the information thereof, the user may access and manage permissions associated with tagged content generated/owned by the user, and the like, as well as various combinations thereof. For example, the user may access his or her remuneration account to view how many credits he or she has received back on the performance of his or her tagged content. The user may manage various other aspects via the established user account.

At step 1008, the content management system receives a registration request(s) for registering an object/sensor, scanner, or content capture device of the user, where the registration request(s) includes registration information for the an object/sensor, scanner, or content capture device being registered.

At step 1010, the content management system associates the registration information of the registration request(s) with the user account of the user.

The user device registration request may be a request to register an object/sensor of the user (e.g., such as where the user has just purchased a new product and would like to active a sensor for the product such that the product may be captured by some or all content capture devices which may capture content including the product). The association of the object/sensor with the user account enables the user to manage information associated with the object/sensor, permissions levels for the object/sensor, and the like, as well as various combinations thereof.

The user device registration request may be a request to register a sensor scanner of the user. The association of the sensor scanner with the user account enables the user to manage permissions associated with the sensor scanner, such as managing the set of sensors with which the sensor scanner may interface.

The user device registration request may be a request to register a content capture device of the user. The association of the content capture device of the user with the user account enables the user to manage various aspects of automatic content tagging, such as controlling various settings of the content capture device, managing the information structure(s) stored on or otherwise available to the content capture device, and the like, as well as various combinations thereof.

It will be appreciated that combinations of such device registration requests may be received from the same user, such as where the user has both objects that he or she is controlling and has a content capture device for capturing content (to be automatically tagged) including the controlled objects.

It will be appreciated that, for each of these types of device registration requests, the registered devices may be associated with the user account of the user such that the user may manage all aspects of content tagging and/or tagged content from a single, centralized location.

At step 1012, method 1000 ends.

Figure 11:
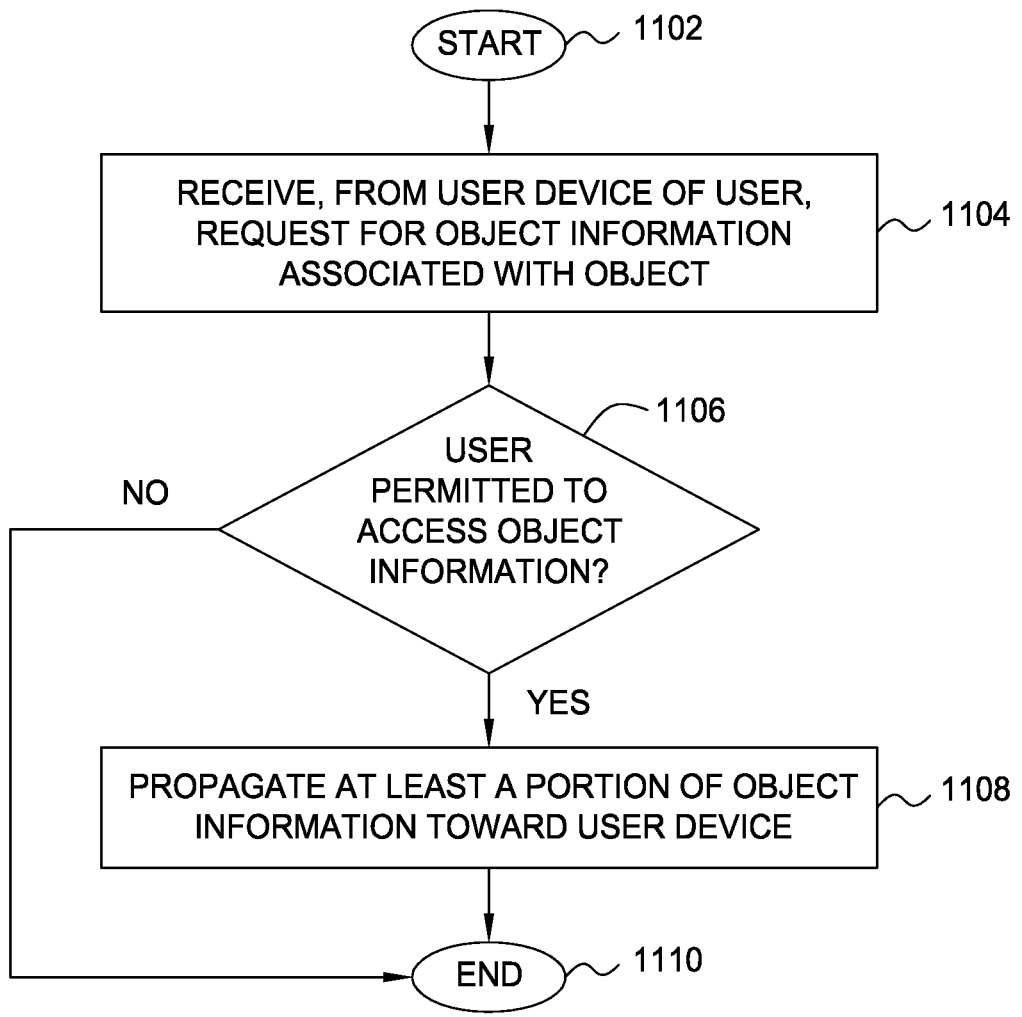
FIG. 11 depicts one embodiment of a method for enabling a content management system to process requests for object information associated with automatic content tagging.

FIG. 11 depicts one embodiment of a method for enabling a content management system to process requests for object information associated with automatic content tagging.

At step 1102, method 1100 begins.

At step 1104, a request for object information, associated with an object, is received. The request is received as part of a process in which captured content is being tagged with an information structure including object information associated with an object in the captured content. The request is associated with a user, and the user has a user device associated therewith (e.g., a content capture device automatically tagging captured content, a computer of the user that is automatically tagging captured content, or any other suitable device).

At step 1106, a determination is made as to whether the user is permitted to access at least a portion of the object information associated with the object. If the user is not permitted to access at least a portion of the object information associated with the object, method 1100 proceeds to step 1110, where method 1100 ends. If the user is permitted to access at least a portion of the object information associated with the object, method 1100 proceeds to step 1108.

At step 1108, at least a portion of the object information associated with the object is propagated toward the user device of the user. From step 1108, method 1100 proceeds to step 1110, where method 1100 ends.

At step 1110, method 1100 ends (as noted above).

Figure 12:
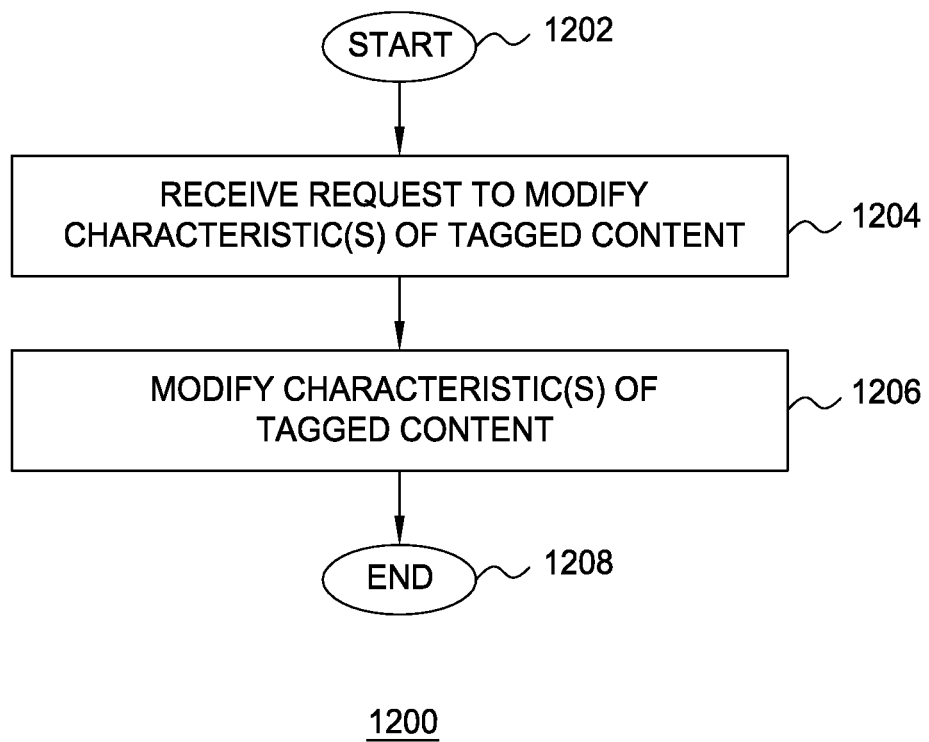
FIG. 12 depicts one embodiment of a method by which a content management system manages tagged content.

FIG. 12 depicts one embodiment of a method by which a content management system manages tagged content.

At step 1202, method 1200 begins.

At step 1204, a request to modify a characteristic of tagged content is received. The characteristic may be any characteristic of tagged content which may be modified. For example, the characteristic may be a permission level associated with the tagged content (e.g., a permission level of the tagged content, a permission level of one or more content tags of the tagged content, and the like). For example, the characteristic may be an expiration date/time associated with the tagged content.

At step 1206, the characteristic associated with the tagged content is modified based on the characteristic indicated in the request to modify the characteristic.

At step 1208, method 1200 ends.

Figure 13:
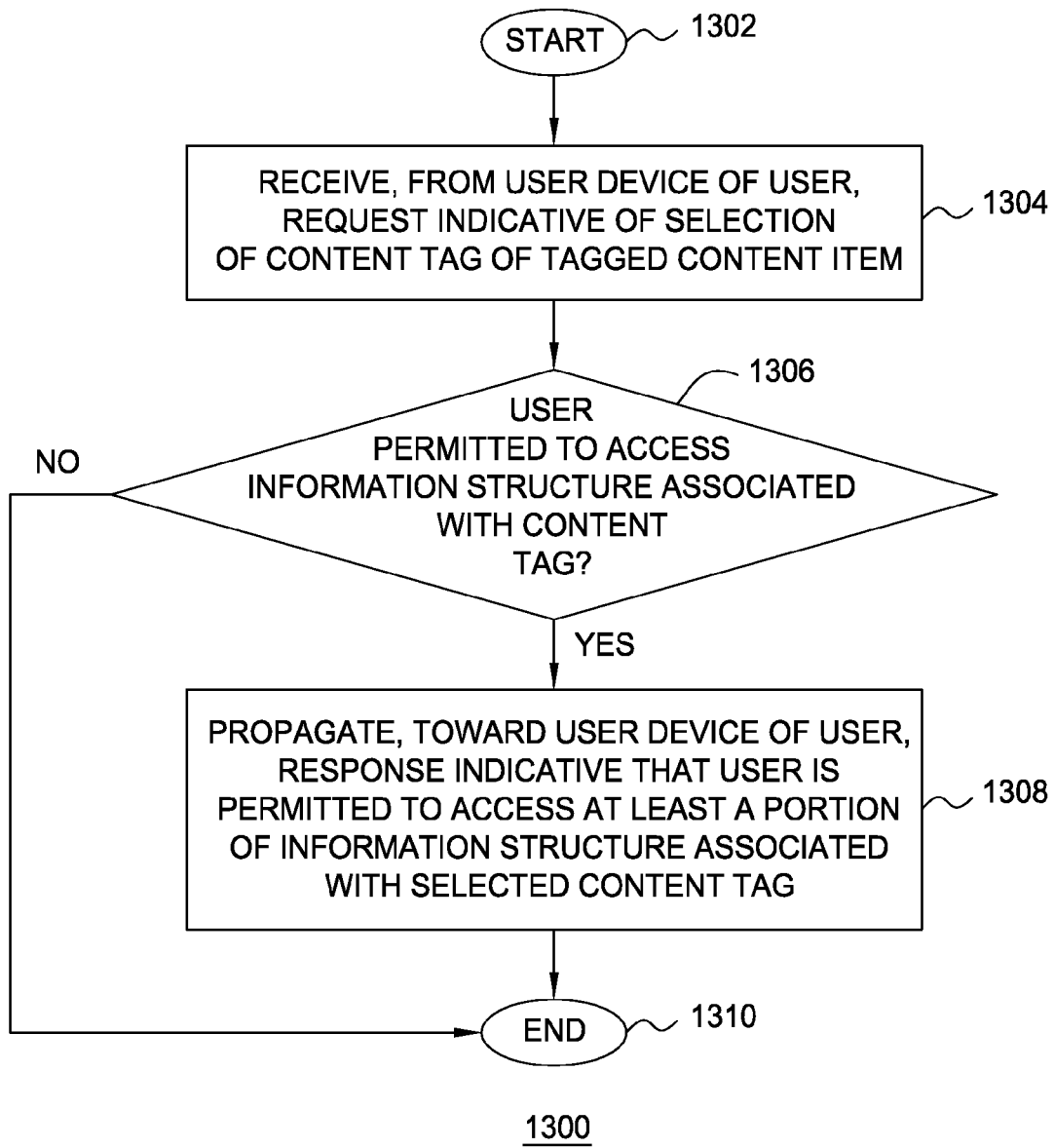
FIG. 13 depicts one embodiment of a method for enabling a content management system to process requests for embedded object information.

FIG. 13 depicts one embodiment of a method for enabling a content management system to process requests for embedded object information.

At step 1302, method 1300 begins.

At step 1304, a request, indicative of selection of a content tag of a tagged content item, is received. The selection of the content tag is associated with a user having a user device. The content tag has an information structure associated therewith.

At step 1306, a determination is made as to whether the user is permitted to access at least a portion of the information structure associated with the selected content tag. If the user is not permitted to access at least a portion of the information structure associated with the selected content tag, method 1300 proceeds to step 1310, where method 1300 ends. If the user is permitted to access at least a portion of the information structure associated with the selected content tag, method 1300 proceeds to step 1308.

At step 1308, a response, indicative that the user is permitted to access at least a portion of the information structure associated with the selected content tag, is propagated toward the user device.

In one embodiment, for example, in which the information structure associated with the selected content tag is available on the user device, the content management system may provide an encryption/decryption key to the user device such that the user device can decrypt the information structure and present the object information via the user device.

In one embodiment, for example, in which the information structure is stored on the content management system, the content management system provides the information structure to the user device so that the user device can extract the object information from the information structure and present the object information via the user device.

In such embodiments, the information (e.g., encryption/decryption key, information structure, and the like) may be provided to the user device as part of the response or separate from the response.

From step 1308, method 1300 proceeds to step 1310, where method 1300 ends.

At step 1310, method 1300 ends (as noted above).

As described herein, the content tagging and management capability supports various business models, provides various advantages, and the like.

The content tagging and management capability augments one or more existing business models and/or enables one or more new business models. In various embodiments described herein, advertising becomes local, with peer-generated content, coupled with associated content generated by the company, possibly having more value to a company than typical advertising campaigns generated by the company.

For example, user-generated content may have more value because people are likely to buy products based on recommendations or influence from their peers (e.g., family, friends, co-workers, and the like), rather than based on advertising campaigns by the providers of the products.

As an example, assume that the user just bought a new television and has friends over to watch some shows on the new television. The user takes a picture of his or her friends watching the television and the television appears in the picture. The television has a sensor embedded therein. The sensor is detected when the user takes the picture, and the picture is automatically tagged with a tag that is associated with the television. The user then sends the picture to the friends that were there, as well as other friends. If any of the friends that receives the picture wants to know more about the new television, they can simply click on the embedded tag within the picture, and information about the television will be made available to the friends (e.g., information provided by the manufacturer of the television, such as where the specs of the television, where the television may be purchased, and the like). In other words, there is a better chance that the picture including the embedded tag will influence the friends of the user to purchase the television (e.g., better than if the picture did not include the tag).

For example, user-generated content may have more value because user-generated content that becomes popular allows the providers of the products to reach a large number of users with information about its products while only remunerating the user that generated the content, as opposed to paying for expensive advertising campaigns. As described herein, a user posts a content item for review by other users (e.g., the user posts a picture or video including embedded content tags created using the content tagging and management capability). As users view the content item, one or more parties may be remunerated based on review of the content item, based on review of the information automatically tagged to the content item, and the like, as well as various combinations thereof. The remuneration may be based on any suitable statistics (e.g., number of views, number of unique views, and the like). In this sense, the more views that a product in a content item generates, the more remuneration is provided. The remuneration may be provided to any suitable party or parties (e.g., the user that created the content item including the embedded tag, the user that posted the content item, a service provider which hosts and/or propagates the content item in response to requests, and the like, as well as various combinations thereof). The remuneration may be provided by any suitable party (e.g., the provider of the object 122 for which remuneration is provided). The remuneration may be provided in any suitable form (e.g., money deposited into an account, electronic coupons and/or credits for enabling the user to purchase products from the provider of the object 122 for which remuneration is provided, electronic coupons and/or credits to stores other than the stores of the provider of the object 122 for which remuneration is provided, and the like, as well as various combinations thereof). The remuneration may be managed in any suitable manner (e.g., using a federated system such as federated system $153_4$, by one or more third parties, and the like).

As an example, further consider the example described above, in which the user just bought a new television and has friends over to watch some shows on the new television. Further assume that one of the pictures including the television has some other interesting things in it, and that the user posts the picture online. The picture then starts to become more popular such that more and more users begin to view the picture. As the users view the picture, some of them may click on the embedded tag associated with the television set. The statistics of the number of times the embedded tag is selected may be tracked, such that the user that took the picture can be remunerated based on the number of times the embedded tag is selected. For example, the user may be remunerated via a federates system on which the user maintains a user account, with which the picture is associated such that the manufacturer of the television can credit the account of the user on the federated system based on the number of times the embedded tag is selected.

The many advantages of the content tagging and management capability depicted and described herein may be further understood by way of reference to some exemplary use case scenarios.

In a first example, assume that it is the birthday of a child. The parents of the child take pictures of the child with family and friends at a birthday party. In one of the pictures, a television is clearly seen in the background. The camera automatically tags the photograph with a tag that is associated with the television. The tag includes information about the television. The tag also includes details of the television show that was on television when the picture was taken (e.g., details about the television show, a timestamp, a link to a website of the television show, and the like, as well as various combinations thereof). A user (e.g., somehow who was at the party, someone who was not at the party but wants to get a sense of what was going on at the party, and the like), while viewing the picture later, will be able to click on the tag on the television in the picture in order to access the information associated with the television (e.g., the information about the television, details of the television show, and the like). In this manner, users are able to find out what was going on at the time that the picture was taken. Similarly, years later the kids will be able to relive the experience with fine details about what was happening on that day. Similarly, various other details can be automatically tagged in other photos and/or videos that are taken. For example, details of gifts given to the child that day may be automatically tagged in various photos and/or videos taken that day. These tags may include any information associated with the gifts, such as specs of the gifts and any other suitable information. The tags also may be adapted to allow users to browse the evolution of these kinds of toys over time, details of toys available from competitors, and the like, as well as various combinations thereof. Similarly, various other objects may be tagged within the pictures for accessing associated object information (e.g., the brands of soda used at the party, the brands of clothes worn by the kids at the party, and the like). In this manner, users can relive various details of the event at any time (e.g., anywhere from days to years later), with easy access to a wealth of information associated with that event.

In a second example, a user tours an art museum and takes pictures of various works of art. In the museum, each work of art has a sensor associated therewith, provided by museum workers under the direction of the curator. As the user takes pictures of each work of art, the associated sensor is detected, information associated with the work of art is obtained, and the pictures are automatically tagged with information about the work of art. The information may include details such as the artist, the name of the work of art, information from the placard displayed in the museum, and the like, as well as various combinations thereof. The information associated with a tag for a work of art also may include information such as a list of other works of art created by the same artist (and, optionally, their details), links to additional information available on the Internet for the work of art, and the like, as well as various combinations thereof. The information associated with the various tags also may include pointers to works of art displayed near the respective works of art, which may be used later by the user and, optionally, other users to take a virtual tour of the museum such that the user(s) may experience the works of art as they are arranged within the museum.

In a third example, the press attends the Oscar Awards show in order to take pictures and/or videos of stars as they arrive on the red carpet. The stars wear clothes and jewelry that have sensors embedded therein. As the press takes the pictures and/or videos, the sensors are detected and the associated pictures and/or videos that are captured are automatically tagged with information about the clothes and jewelry (e.g., designer, links where the items may be purchased, and the like, as well as various combinations thereof). The press then posts the pictures and/or videos such that they are available to users online. As users browse the pictures and/or videos, the user may select the embedded tags in order to access the information that is associated with the tags.

In a fourth example, a family is on vacation touring national monuments by driving between the national monuments. The family, during transmit between the monument, may stop at various places along the highway, at which time they may take pictures. The pictures may include pictures of hotels, restaurants, places of interest, and the like. As each picture is taken, one or more sensors affixed to the outside of the hotels, restaurants, and places of interest are detected, and the associated pictures are automatically tagged with content associated with the hotels, restaurants, and places of interest, respectively. Similarly, at each of the national monuments, the family takes pictures of the monuments. As each picture is taken, one or more sensors affixed to each of the monuments are detected, and the associated pictures are automatically tagged with content associated with the respective monuments. The family can then view the pictures later and will have access to a wealth of information about the various sites that they visited, including information which may not have been readily available at the sites themselves.

In a fifth example, associated with social media based distribution of tagged content, a user takes a photo/video, via his or her handheld device, of the object that he or she is looking at, and would like impromptu reviews from other people via one or more of his or her social media sites. The user would tag the content using the content tagging and management capability depicted and described herein, and at the same time distribute the tagged content to one or more social media portals (e.g., via URL, audionote, videonote, or any other suitable distribution capabilities). In this manner, people associated with the user via such social media portals (e.g., the user's social media friends, family, contacts, followers, and the like) would be able to immediately look at the media and, further, would be able to immediately look at what the user wants them to look at by simply clicking on the tag embedded within the tagged content. This would give them a real-world augmented-reality feeling that they are standing next to the user. This also would enable them to reply with to the tagged content (e.g., with their reviews, feedback, likes, dislikes, experiences, and the like) via social media in near-real-time.

It will be appreciated that the foregoing examples are merely a few examples of the many ways in which the content tagging and management capability depicted and described herein may be used.

Although primarily depicted and described herein with respect to embodiments in which the content tagging and management capability is used for automatically tagging specific types of content (e.g., primarily image-based content such as pictures and videos), it will be appreciated that the content tagging and management capability may be used for tagging other types of content as well (e.g., text-based content, audio-based content, and the like).

Although primarily depicted and described herein with respect to embodiments in which objects in captured content are automatically tagged based on detection of sensors associated with the objects and/or detection of content objects within the captured content, in various other embodiments the principles of the content tagging and management capability may be applied to provide various other capabilities.

In one embodiment, for example, the contents of a content item may be validated using one or more tags associated with the object. For example, the contents of applications, resumes, and the like may be validated using one or more tags associated with those content items. For example, in a resume, one or more tags may be associated with the resume by the person who is creating the resume for use by the reviewer of the resume to verify such things as educational qualifications of the person, affiliations of the person listed on the resume, certificates listed on the resume by the person, and the like. In one such embodiment, for example, authorized agencies may be able to pull all of the relevant information associated with the resume and validate the information.

In one embodiment, for example, audio content may be automatically tagged using principles of the content tagging and management capability depicted and described herein. In one embodiment, for example, audio content may be processed for identifying particular portions of audio included within the audio content (e.g., particular words, phrases, and the like). The tagging of audio content in this manner may be used for various purposes.

In one such embodiment, for example, principles of the content tagging and management capability may be utilized for customizing songs and other audio based on listener preferences. In one embodiment, for example, a song, audio book, or other audio content is recorded with multiple singers/speakers singing/speaking the same parts, such that the listener may be provided with an option to select which version of the audio content the listener would prefer to use. In one embodiment, for example, tagged portions of audio may be selective replaced (e.g., words, phrases, advertisements, and the like), such that the audio content that is ultimately played for the user is selected based on the preferences of the listener. In one embodiment, for example, the viewer may be provided with a capability to specify one or more of a plurality of different characteristics for a song, audio book, or other audio content. In one embodiment, for example, the one or more aspects of audio content are customized (e.g., via addition and/or filtering of audio content) based on a profile of the audience to be listening to the audio (e.g., excluding R-rated portions where the entire family is listening to the audio, replacing R rated portions with more family-friendly content where the entire family is listening to the audio, and the like).

In one embodiment, for example, principles of the content tagging and management capability may be utilized for customizing movies based on viewer preferences. In one embodiment, for example, a movie is filmed with multiple actors playing the same lead role such that the viewer may be provided with an option to select which version of the movie the viewer would like to watch (i.e., which lead actor). In one embodiment, for example, objects within a movie may be selectively inserted into the movie, based on prior tagging of the objects in the movie, such that the objects that appear in the version of the movie that is viewed by the viewer are objects that are selected based on the preferences of the viewer. In one embodiment, for example, the viewer may be provided with a capability to specify one or more of a plurality of different characteristics for a movie, such as one or more of selecting a genre for the movie (e.g., watching the movie as an action movie, as a comedy, and the like), selecting a rating for the movie (e.g., watching the movie as a PG-rated movie, a PG-13 rated movie, or an R rated movie), and the like, as well as various combinations thereof. In one embodiment, for example, the one or more aspects of a movie are customized (e.g., via addition and/or filtering of content) based on a profile of the audience to be watching the movie (e.g., excluding R-rated scenes or portions of scenes where the movie will be watched by the whole family, replacing R rated scenes or portions of scenes with more family-friendly content where the movie will be watched by the whole family, and the like). In such embodiments, movies become highly customizable based on the preferences of the person or people watching the movie, including processing to modify one or more of the genre of the movie, the actors in the movie, the rating of the movie, scenes included within the movie, scenes or portions of scenes included within and/or filtered from the movie, objects within the movie, and the like, as well as various combinations thereof.

The content tagging and management capability may provide new features and capabilities for content providers and/or service providers.

In one embodiment, for example, the content tagging and management capability enables content providers (e.g., Google, Yahoo, Microsoft, and the like) and their content suppliers to automatically create content. The content tagging and management capability enables product advertisers to generate, modify, and customize advertisements of their products by simply changing the information stored for the products at a central location (e.g., stored at particular URLs for the products).

In one embodiment, for example, the content tagging and management capability enables population of additional details within virtual map applications, such as Google Earth, Virtual Earth 3DVIA from Microsoft, and like virtual map applications. For example, virtual maps of such virtual map applications may be supplemented with real photographs and/or videos of the various objects depicted within such virtual maps (e.g., pictures and/or videos of rooms within buildings, product aisles within stores, art within museums, and the like, as well as various combinations thereof).

In one embodiment, for example, content providers and/or service providers can host interesting content from users at a content site(s). The hosted content will generate advertising traffic for the service providers. The service providers may position new services and advertisements targeted toward content viewers visiting the content site.

In one embodiment, for example, content providers and/or service providers can facilitate various aspects of the content tagging and management capability based on automatic content transmission/storage rights and revenue sharing mechanisms defined for the content providers and/or service providers.

In one embodiment, for example, service providers provide secure network connectivity which enables the content rich communication services to be supported. In one such embodiment, for example, the service providers may be responsible for brokering end-user sessions.

In one embodiment, for example, service providers may provide communication services to end-users via automatically tagged content. In one such embodiment, for example, a service providers may allow a user to call a phone line associated with a telephone in a picture or video (without the user knowing the number) by simply clicking on the tag embedded within the picture/video for the telephone.

The content tagging and management capability may provide various other new features and capabilities. The content tagging and management capability provides a Web2.0 architecture based on augmented reality principles enabling users to access information via content automatically tagged via detection of various types of sensors. The content tagging and management capability provides integration of content capture devices, such as cameras and camcorders, with various types of sensors, such as barcodes, Bokodes, RFIDs, motes, and the like. The content tagging and management capability provides a mechanism by which such sensors, which are associated with objects, may be automatically and securely associated with information and Internet sites for enabling access to information associated with the objects from various wired and/or wireless Internet-accessible devices. The content tagging and management capability provides one or more content management environments which may be used by object providers/managers to manage object information (e.g., object features, advertisement information, promotional information, advertisement remuneration for content owners that own the content having the objects depicted therein, and the like), which may be used by content owners to manage object information (e.g., information provided by the content owners, content/user permissions for controlling access to tagged content or portions of tagged content, and the like), and/or which may be used by any other interested parties. The content management environment(s) may include one or more of the following: one or more user applications, one or more application programming interfaces (APIs), one or more content definition languages, one or more content editors (e.g., for defining/organizing object information stored on sensors, for defining/organizing information structures for association with content tags within capture content, and the like) one or more communications protocols, and the like, as well as various combinations thereof. The content tagging and management capability provides a complete application framework that may be used by network operators and/or telecommunication providers around the globe to support automatic tagging of content and accessing of automatically tagged content. The content tagging and management capability provides hierarchical security policies which may be controlled by object providers/managers, users controlling access to automatically tagged content, and/or any other interested parties. The content tagging and management capability provides various other capabilities and advantages.

Although primarily depicted and described with respect to various embodiments in which an object 122 has only one sensor 124 associated therewith, in various other embodiments an object 122 may have multiple sensors 124 associated therewith (which may be referred to herein as a sensor set of the object 122). In such embodiments, the multiple sensors 124 may be associated with the object 122 for one or more reasons. In one embodiment, for example, multiple sensors 124 may be associated with an object 122 for enabling identification of the boundaries of the object (e.g., for use in determining the dimensions of the object 122, for use in determining the shape of the object, and the like, as well as various combinations thereof). In one embodiment, for example, multiple sensors 124 may be associated with an object 122 for enabling the sensors 124 to be visible and thus, detectable, from various angles from which the object 122 may be captured during content capture. In one embodiment, for example, multiple sensors 124 may be associated with an object 122 for enabling support for different levels of permission regarding access to object information for the object 122 (e.g., such as where the different sensors 124 have different access permission levels associated therewith). The use of multiple sensors 124 for a given object 122 may be employed for various other purposes.

Although primarily depicted and described herein within respect to embodiments in which only a single object is automatically tagged within captured content, it will be appreciated that any number of objects may be tagged within captured content.

Although primarily depicted and described herein with respect to use of specific types, numbers, and arrangements of networks, protocol, systems, devices, sensors, objects, and the like, it will be types, numbers, and/or arrangements of networks, protocol, systems, devices, sensors, objects, and the like may be utilized for providing various functions of automatic content tagging and/or tagged content management functions depicted and described herein.

Figure 14:
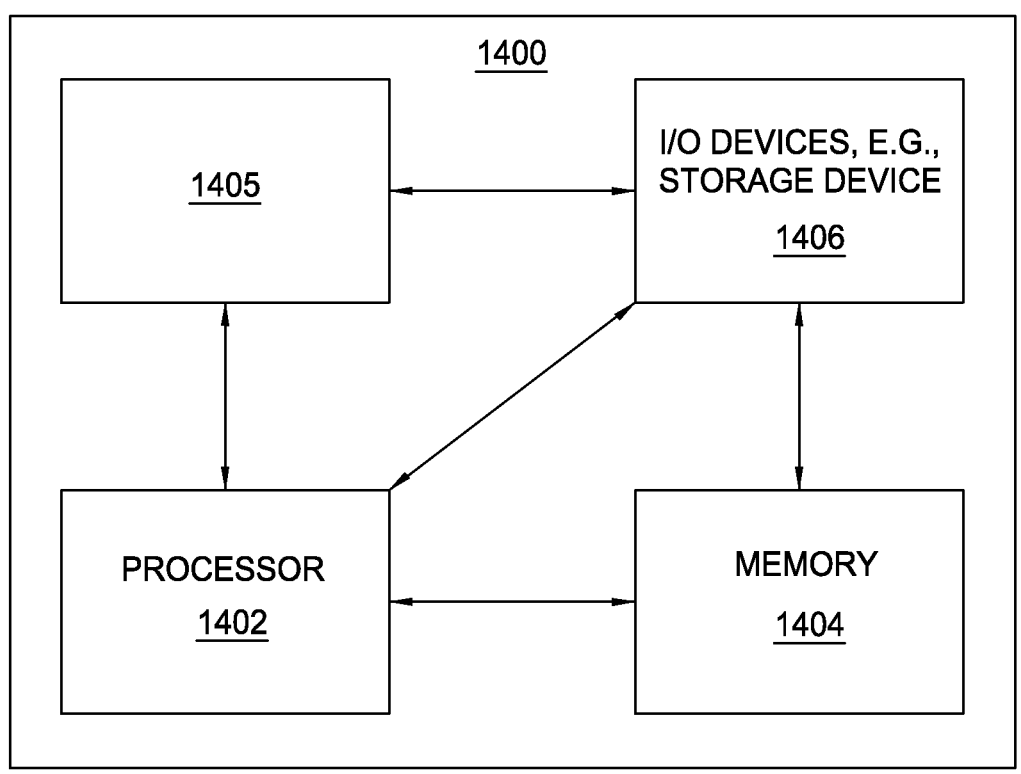
FIG. 14 depicts a high-level block diagram of a computer suitable for use in performing the functions described herein.

FIG. 14 depicts a high-level block diagram of a computer suitable for use in performing the functions described herein. As depicted in FIG. 14, computer 1400 includes a processor element 1402 (e.g., a central processing unit (CPU), two or more co-processors, and/or other suitable processor(s)), a memory 1404 (e.g., random access memory (RAM), read only memory (ROM), and the like), reduction cooperating module/process 1405, and various input/output devices 1406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software, hardware, and/or a combination of software and hardware, e.g., using a general purpose computer, one or more application specific integrated circuits (ASIC), and/or any other equivalents. In one embodiment, cooperating process 1405 can be loaded into memory 1404 and executed by processor 1402 to implement the functions as discussed hereinabove. As such, cooperating process 1405 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
  receive a content item comprising content and having a tag associated therewith;
  initiate display of the content item via a display interface, wherein display of the content item comprises display of the tag associated with the content item; and
  based on a determination that the tag is selected via the display interface, perform a process for validating at least a portion of the content of the content item based on the tag associated with the content item;
  wherein the tag has an information structure associated therewith, wherein the information structure comprises information indicative of a content source associated with the at least a portion of the content of the content item.

2. The apparatus of claim 1, wherein, to perform the process for validating at least a portion of the content of the content item based on the tag associated with the content item, the processor is configured to:
  identify the content source based on the tag;
  send, toward the content source, a request for content from the content source;
  receive the content from the content source; and
  perform at least one of storing or displaying the content received from the content source.

3. The apparatus of claim 1, wherein, to perform the process for validating at least a portion of the content of the content item based on the tag associated with the content item, the processor is configured to:
  Identify the content source based on the tag;
  send, toward the content source, a request for content from the content source;
  receive the content from the content source; and
  validate at least a portion of the content of the content item via a comparison of the at least a portion of the content of the content item with at least a portion of the content received from the content source.

4. The apparatus of claim 1, wherein, to perform the process for validating at least a portion of the content of the content item based on the tag associated with the content item, the processor is configured to:
  identify the content source based on the tag;
  send, toward the content source, a portion of the content of the content item; and
  receive, from the content source, an indication as to whether the portion of the content of the content item was validated by the content source.

5. The apparatus of claim 1, wherein the content item comprises at least one of text-based content, audio content, or image-based content.

6. The apparatus of claim 1, wherein the content item comprises at least one of an application, a resume, a certificate, or a title.

7. The apparatus of claim 1, wherein, within the content item, the tag is associated with the at least a portion of the content of the content item to be validated based on the tag.

8. The apparatus of claim 1, wherein, to perform the process for validating at least a portion of the content of the content item based on the tag associated with the content item, the processor is configured to:
propagate, toward at least one authorized agency, the at least a portion of the content of the content item to be validated.

9. A method, comprising:
using a processor and a memory for:
receiving a content item comprising content and having a tag associated therewith;
initiating display of the content item via a display interface, wherein display of the content item comprises display of the tag associated with the content item; and
based on a determination that the tag is selected via the display interface, performing a process for validating at least a portion of the content of the content item based on the tag associated with the content item;
wherein the tag has an information structure associated therewith, wherein the information structure comprises information indicative of a content source associated with the at least a portion of the content of the content item.

10. The method of claim 9, wherein performing the process for validating at least a portion of the content of the content item based on the tag associated with the content item comprises:
identifying the content source based on the tag;
sending, toward the content source, a request for content from the content source;
receiving the content from the content source; and
performing at least one of storing or displaying the content received from the content source.

11. The method of claim 9, wherein performing the process for validating at least a portion of the content of the content item based on the tag associated with the content item comprises:
identifying the content source based on the tag;
sending, toward the content source, a request for content from the content source;
receiving the content from the content source; and
validating at least a portion of the content of the content item via comparison of the at least a portion of the content of the content item with at least a portion of the content received from the content source.

12. The method of claim 9, wherein performing the process for validating at least a portion of the content of the content item based on the tag associated with the content item comprises:
identifying the content source based on the tag;
sending, toward the content source, a portion of the content of the content item; and
receiving, from the content source, an indication as to whether the portion of the content of the content item was validated by the content source.

13. The method of claim 9, wherein the content item comprises at least one of text-based content, audio content, or image-based content.

14. The method of claim 9, wherein the content item comprises at least one of an application, a resume, a certificate, or a title.

15. The method of claim 9, wherein, within the content item, the tag is associated with the at least a portion of the content of the content item to be validated based on the tag.

16. The method of claim 9, wherein performing the process for validating at least a portion of the content of the content item based on the tag associated with the content item comprises:
propagating, toward at least one authorized agency, the at least a portion of the content of the content item to be validated.

17. A non-transitory computer-readable storage medium storing instructions which, when executed by a computer, cause the computer to perform a method, the method comprising:
receiving a content item comprising content and having a tag associated therewith;
initiating display of the content item via a display interface, wherein display of the content item comprises display of the tag associated with the content item; and
based on a determination that the tag is selected via the display interface, performing a process for validating at least a portion of the content of the content item based on the tag associated with the content item;
wherein the tag has an information structure associated therewith, wherein the information structure comprises information indicative of a content source associated with the at least a portion of the content of the content item.

* * * * *